(12) United States Patent
Hotta et al.

(10) Patent No.: US 8,915,519 B2
(45) Date of Patent: Dec. 23, 2014

(54) METHOD FOR MANUFACTURING AIRBAG

(71) Applicant: Toyoda Gosei Co., Ltd., Kiyosu-shi, Aichi-ken (JP)

(72) Inventors: Masashi Hotta, Kiyosu (JP); Yuji Sato, Kiyosu (JP); Kensaku Honda, Kiyosu (JP); Yoshiaki Goto, Kiyosu (JP); Akira Yamashita, Kiyosu (JP); Takashi Iida, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 14/157,722

(22) Filed: Jan. 17, 2014

(65) Prior Publication Data

US 2014/0208567 A1    Jul. 31, 2014

(30) Foreign Application Priority Data

Jan. 25, 2013 (JP) ................................. 2013-012411
Mar. 28, 2013 (JP) ................................. 2013-070317

(51) Int. Cl.
*B60R 21/233* (2006.01)
*B60R 21/2346* (2011.01)
*B60R 21/231* (2011.01)
*B60R 21/2338* (2011.01)

(52) U.S. Cl.
CPC ........... *B60R 21/2346* (2013.01); *B60R 21/233* (2013.01); *B60R 2021/23146* (2013.01); *B60R 2021/23324* (2013.01); *B60R 2021/23382* (2013.01)
USPC ........................................ 280/729; 280/743.1

(58) Field of Classification Search
CPC .............. B60R 21/233; B60R 21/2346; B60R 2021/23146; B60R 2021/23316; B60R 2021/23324; B60R 2021/23382
USPC ........................... 280/729, 730.2, 743.1, 739
See application file for complete search history.

(56) References Cited

U.S. PATENT DOCUMENTS

| 8,356,835 | B2 * | 1/2013 | Yamamoto ................. 280/730.2 |
| 8,419,060 | B2 * | 4/2013 | Yamamoto et al. ........ 280/743.2 |
| 8,528,934 | B2 * | 9/2013 | Kobayshi et al. ............. 280/740 |
| 8,567,817 | B2 * | 10/2013 | Yamamoto ..................... 280/729 |
| 8,628,111 | B2 * | 1/2014 | Sugimoto et al. ............. 280/729 |
| 8,757,657 | B1 * | 6/2014 | Hotta et al. ................. 280/730.2 |
| 8,764,056 | B2 * | 7/2014 | Wipasuramonton et al. .......................... 280/743.1 |
| 2006/0001244 | A1 * | 1/2006 | Taguchi et al. ............... 280/729 |

FOREIGN PATENT DOCUMENTS

JP            05-042001 U        6/1993

* cited by examiner

*Primary Examiner* — Drew Brown
(74) *Attorney, Agent, or Firm* — Posz Law Group, PLC

(57) ABSTRACT

An airbag is manufactured as follows. In a first joining step, peripheral portions of structural fabric portions that are located closer to the main body fabric portions at the installation are joined to the main body fabric portions in a spread state. In a second joining step, a part that is not overlaid onto the structural fabric portions is joined to the main body fabric portions, and a part that is overlaid onto the structural fabric portions is joined only to the structural fabric portions. In a third joining step, peripheral portions of the structural fabric portions that are separated away from the main body fabric portions at the installation are joined to each other.

6 Claims, 13 Drawing Sheets

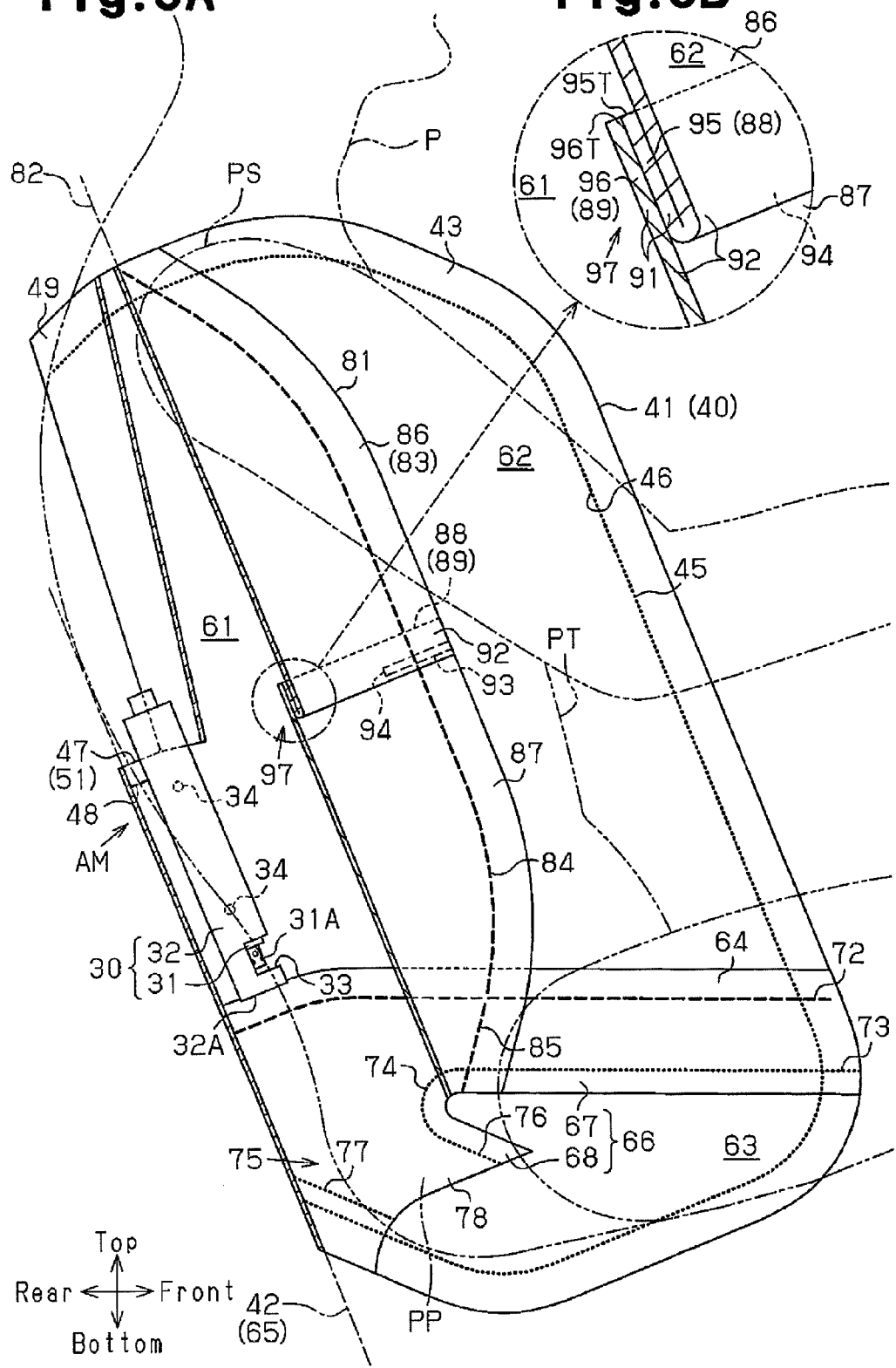

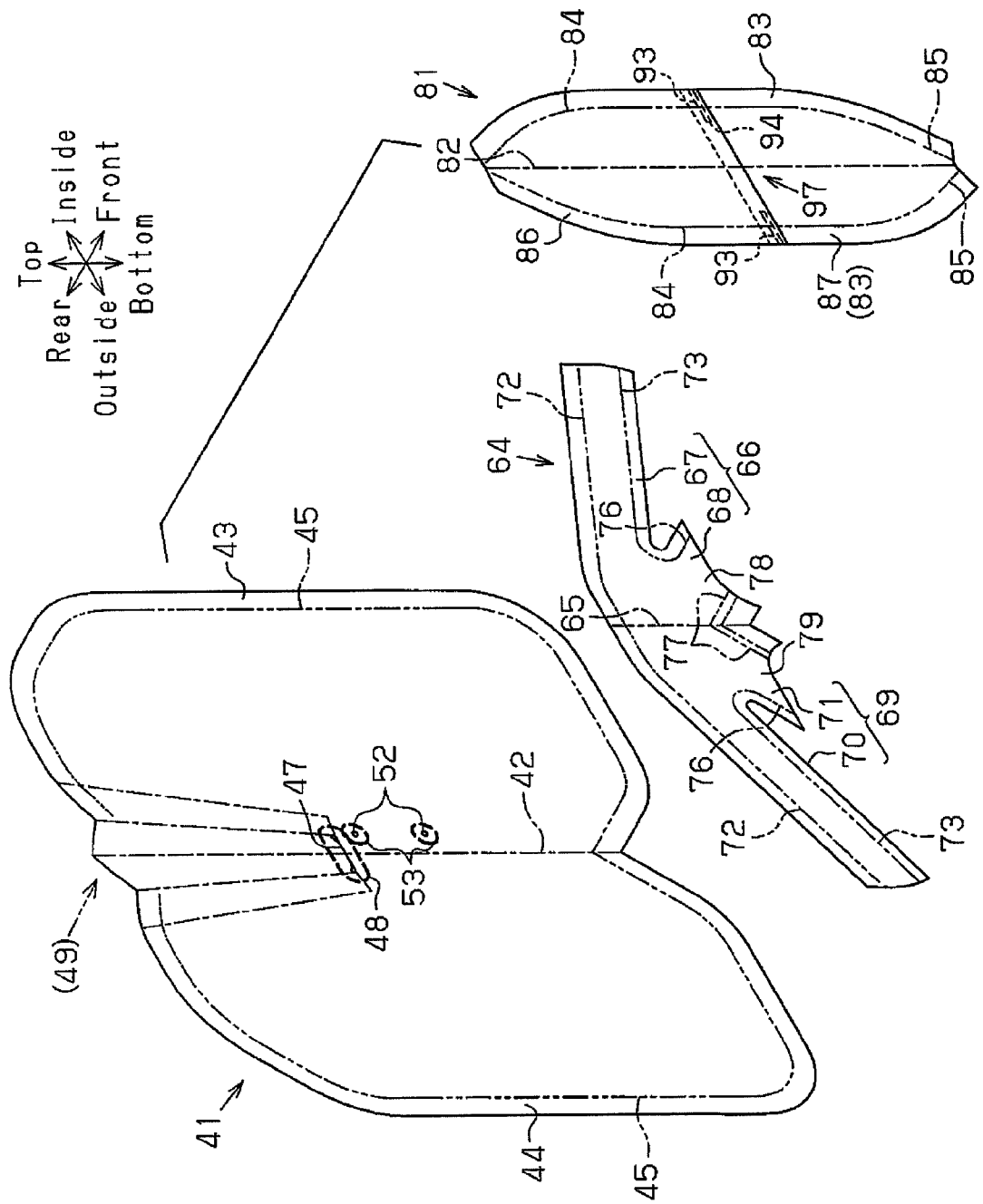

METHOD FOR MANUFACTURING AIRBAG

BACKGROUND OF THE INVENTION

The present invention relates to a method for manufacturing an airbag that is employed as a component of an airbag apparatus installed in a vehicle such as a motor vehicle and is deployed and inflated in the vicinity of an occupant to restrain and protect the occupant.

An airbag apparatus is effective for protecting an occupant seated in a seat from an impact applied to a vehicle such as a motor vehicle. Japanese Laid-Open Utility Model Publication No. 5-42001 discloses such an airbag apparatus. The outer shape of the airbag, which is a part of the airbag apparatus, is formed by an airbag main body. As shown in FIG. 25, an airbag main body 151 is formed into a bag-like shape by joining a pair of main body fabric portions 152 to each other along peripheries. The airbag main body 151 includes an inflation portion, which is inflated by inflation gas supplied in response to an impact applied to the vehicle.

The inflation portion has inflation chambers, which are defined by a first partition 153 and second partitions 154 installed to extend between the main body fabric portions 152. Each second partition 154 has a part that extends in a direction intersecting with the first partition (substantially the left-right direction as viewed in FIG. 25) and contacts the first partition 153. The inflation chambers include a first inflation chamber 155, which is supplied with inflation gas from an inflator (not shown), and second inflation chambers 156, which are adjacent to the first inflation chamber 155 with the first partition 153 in between.

The first partition 153 has openings 157, each of which corresponds to one of the second inflation chambers 156. The first inflation chamber 155 is connected to each of the second inflation chambers 156 via the corresponding opening 157. The first partition 153 also has check valves 158, each of which is located at a position corresponding to one of the openings 157. Each check valve 158 permits inflation gas to flow from the first inflation chamber 155 to the corresponding second inflation chamber 156, while restricting inflation gas from flowing back (from the second inflation chamber 156 to the first inflation chamber 155).

The airbag main body 151 has the inflation portion, which is divided into multiple inflation chambers (the first inflation chamber 155 and the second inflation chambers 156) by multiple partitions (the first partition 153 and the second partitions 154), each of which is installed to extend between the main body fabric portions 152. In the airbag main body 151 with such a structure, the way in which the partitions (the first and second partitions 153, 154) are attached to the airbag main body 151 can be a difficult task. Particularly, in the above described publication, each second partition 154 is installed to extend between the main body fabric portions 152, while partly extending in a direction intersecting with the first partition 153 and being attached to the first partition 153. In such an airbag, the attachment of the second partitions 154 is troublesome. However, the publication only recites the structure of the airbag, but fails to describe a method for manufacturing the airbag.

Accordingly, it is an objective of the present invention to provide a method for easily manufacturing an airbag having an inflation portion that is divided into a plurality of inflation chambers by a first partition that is installed to extend between a pair of main body fabric portions and a second partition that is installed to extend between the main body fabric portions while contacting the first partition.

To achieve the foregoing objective and in accordance with one aspect of the present invention, a method for manufacturing an airbag is provided. The airbag is formed into a bag shape by joining peripheral portions of two main body fabric portions and has an inflation portion that is inflated by inflation gas. The airbag includes two structural fabric portions. A first partition is installed to extend between the main body fabric portions. A second partition having an extended end is installed to extend between the main body fabric portions in a state in which the second partition extends in a direction intersecting with the first partition and the extended end is overlaid onto the structural fabric portions. At least a part of the inflation portion is divided into a plurality of inflation chambers by the first partition and the second partition. The airbag manufacturing method includes a first joining step, a second joining step, and a third joining step. In the first joining step, a peripheral portion in each structural fabric portion that is brought closer to the main body fabric portions at the installation is joined to the main body fabric portions in a spread state. In the second joining step, in a pair of outer peripheral portions of the second partition in a spread state, a part that is not overlaid onto the structural fabric portions is joined to the main body fabric portions, and a part that is overlaid onto the structural fabric portions is joined only to the structural fabric portions. In the third joining step, peripheral portions of the structural fabric portions that are separated away from the main body fabric portions at the installation are joined to each other.

BRIEF DESCRIPTION OF THE DRAWINGS

FIG. 5A is a partial cross-sectional side view showing the internal structure of the airbag module shown in FIG. 4, together with an occupant;

FIG. 5B is an enlarged partial cross-sectional side view illustrating a part of FIG. 5A;

FIG. 6 is an exploded perspective view showing a main body fabric portion, a lateral partition, and a vertical partition, which are components of the airbag of the first embodiment;

DETAILED DESCRIPTION OF THE PREFERRED EMBODIMENTS

First Embodiment

A an airbag manufacturing method according to a first embodiment will now be described with reference to FIGS. 1 to 18. The method is employed for manufacturing an airbag in a side airbag apparatus.

The side airbag apparatus is installed in a vehicle, which is a motor vehicle in the present embodiment. In the following, the direction in which a vehicle advances forward will be referred to as the front, and reverse direction will be referred to as the rear. The middle of the widthwise direction of the vehicle is used as reference in the widthwise direction of the vehicle. A side closer to the middle of the widthwise direction will be referred to as "inner side" of the vehicle, while a side farther from the middle of the widthwise direction will be referred to "outer side" of the vehicle.

It is provided that an average sized occupant (adult) is seated in a vehicle seat in an adequate posture.

Figure 1:
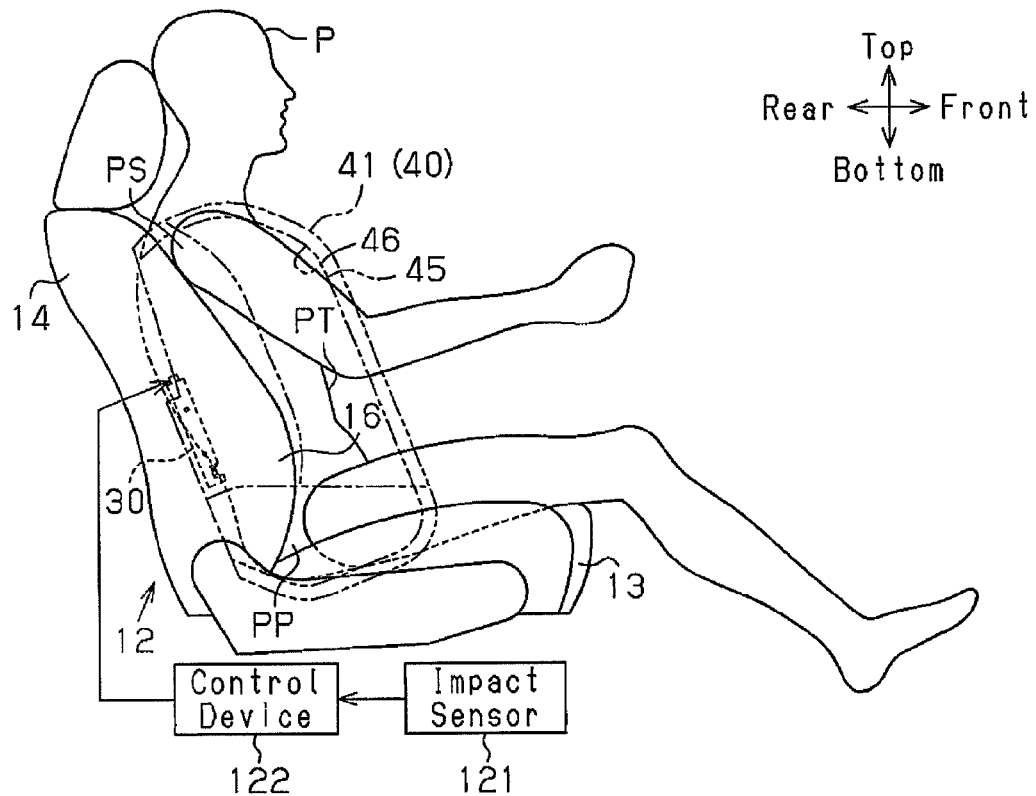
FIG. 1 is a side view of an airbag manufacturing method according to a first embodiment, showing the positional relationship between an airbag manufactured by the method, a vehicle seat, and an occupant.
Figure 2:
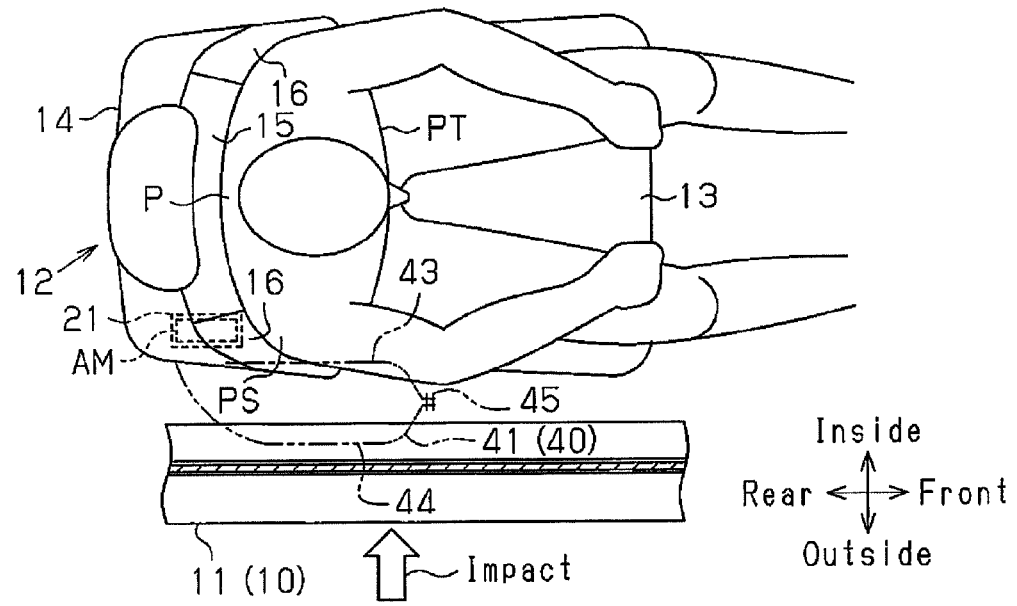
FIG. 2 is a schematic cross-sectional plan view of the positional relationship of the vehicle seat, the airbag, the occupant, and a body side portion according to the first embodiment.

As shown in FIGS. 1 and 2, a vehicle seat 12 is arranged on the inner side (upper side as viewed in FIG. 2) of a body side portion 11 of a vehicle 10. The body side portion 11 refers to a vehicle component that is located at a side of the vehicle 10, and mainly corresponds to doors and pillars. For example, part of the body side portion 11 corresponding to the front seat includes a front door, a center pillar (B-pillar), and the like. Part of the body side portion 11 corresponding to the rear seat includes a rear part of the side door (rear door), a C-pillar, a front part of the wheel well, a rear quarter, and the like.

The vehicle seat 12 includes a seat cushion 13 and a seat back 14. The seat back 14 extends upward from the rear end of the seat cushion 13 and includes a tilt adjusting mechanism capable of adjusting the tilt angle of the seat back 14. The vehicle seat 12 is arranged in the vehicle 10 such that the seat back 14 faces forward of the vehicle 10. The widthwise direction of the thus arranged vehicle seat 12 matches with the widthwise direction of the vehicle 10.

The seat back 14 includes a seat back main body 15 and a pair of side supports 16, which is provided on both sides of the seat back main body 15 in the widthwise direction. The seat back main body 15 is tilted rearward, and supports the upper body of an occupant P from the rear. The side supports 16 protrude forward from the seat back main body 15, and restrict the widthwise movement of the upper body of the occupant P, who is seated on the seat cushion 13 and leaning against the seat back main body 15.

The internal structure of the outer side portion of the seat back 14 including the outer side support portion 16 will now be described.

Figure 3:
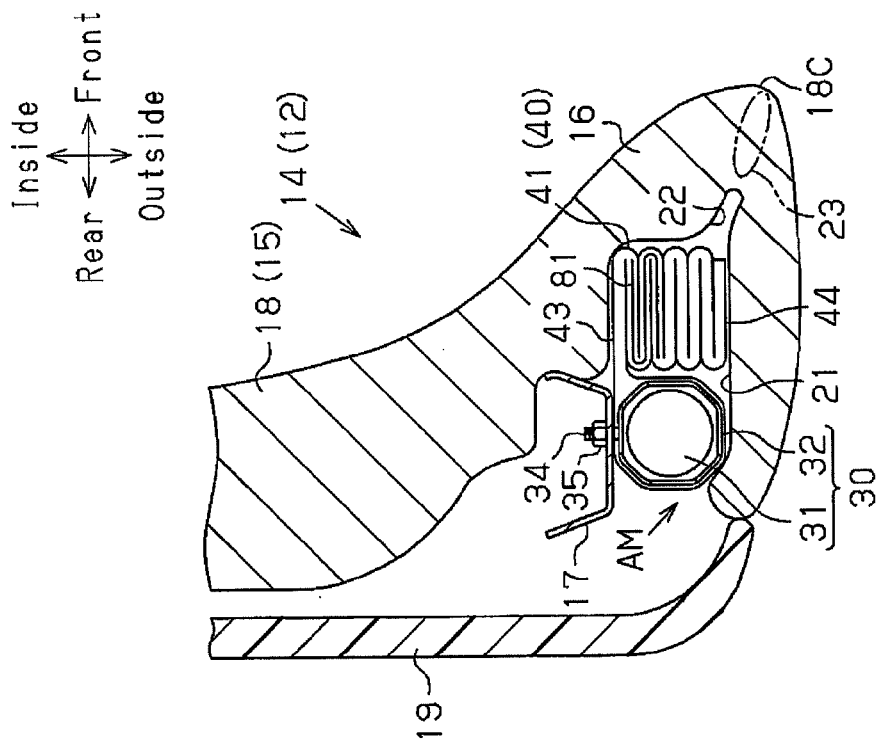
FIG. 3 is a partially cross-sectional plan view showing the internal structure of a side portion of the seat back in which the airbag module of the first embodiment is installed.

A seat frame, which forms a framework of the seat back 14, is incorporated in the seat back 14. As shown in FIG. 3, a part of the seat frame is located in the outer part of the seat back 14 (a lower part as viewed in FIG. 3). The part of the seat frame (hereinafter referred to as a side frame portion 17) is formed by bending a metal plate. A seat pad 18, which is made of an elastic material such as urethane foam, is provided on the front side of the seat frame, which includes the side frame portion 17. Also, a hard back board 19, which is formed, for example, of plastic, is arranged on the back of the seat frame. Although the seat pad 18 is coated with a cover, the cover is not illustrated in FIG. 3. The same applies to FIG. 15, which will be discussed below.

In the seat pad 18, a storage portion 21 is provided in the vicinity of the outer side of the side frame portion 17. The storage portion 21 is located at a middle part of the seat back 14 in the up-down direction and in the vicinity of and diagonally rearward of the occupant P seated in the vehicle seat 12 (see FIGS. 1 and 2). The storage portion 21 accommodates an airbag module AM of the side airbag apparatus.

A slit 22 is formed to extend from the outer front corner of the storage portion 21. The slit 22 extends diagonally forward and toward the exterior. A part between a front corner 18C of the seat pad 18 and the slit 22 (a part surrounded by a line formed by a long dash alternating with two short dashes in FIG. 3) forms a breakable portion 23, which is designed to be broken by an airbag 40, which will be discussed below.

The airbag module AM, which is installed in the seat back 14, includes as its main components the airbag 40 and an inflator assembly 30. Each of these components will now be described.

<Inflator Assembly 30>

Figure 4:
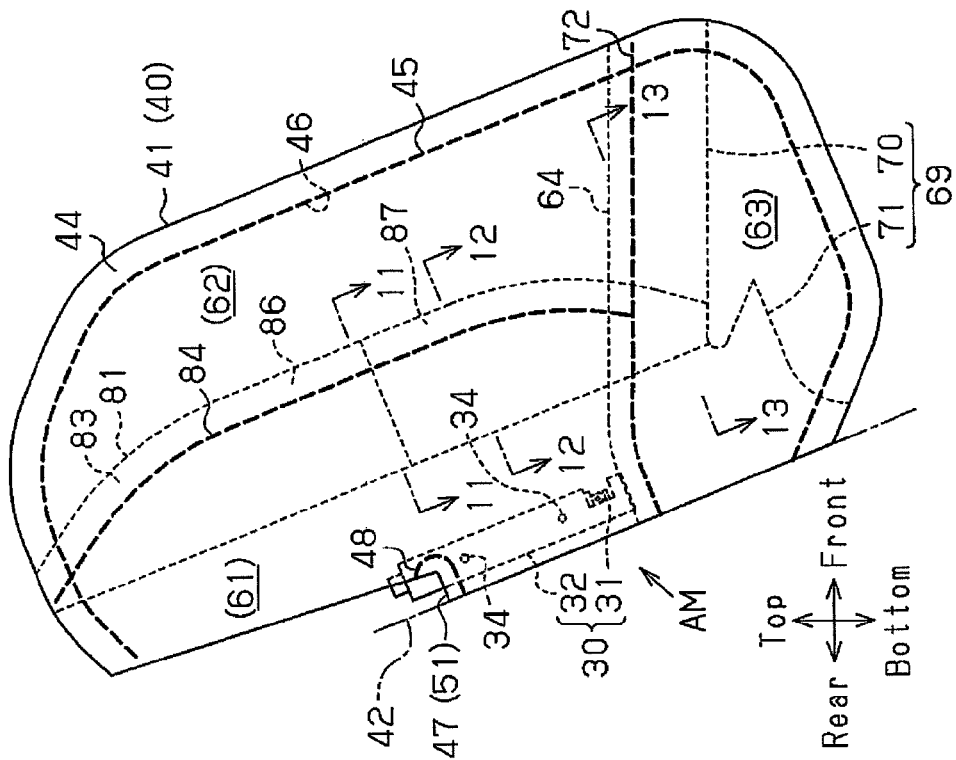
FIG. 4 is a side view illustrating the airbag module in a state where the airbag main body is in an uninflated and deployed state in the first embodiment.

As shown in FIGS. 3 to 5, the inflator assembly 30 includes an inflator 31, which generates gas, and a retainer 32, which surrounds the inflator 31. In the first embodiment, a pyrotechnic type inflator is employed as the inflator 31. The inflator 31 is substantially columnar and accommodates a gas generating agent (not shown), which generates inflation gas. A gas outlet 31A is provided at the lower end of the inflator 31. A harness (not shown), which is wiring for applying activating signals to the inflator 31, is connected to the upper end of the inflator 31.

In place of the pyrotechnic type inflator using the gas generating agent, it is possible to use a hybrid type inflator, which jets out inflation gas by breaking a partition wall of a high-pressure gas cylinder filled with high-pressure gas with a low explosive.

The retainer 32 functions as a diffuser for controlling the direction of discharged inflation gas and also functions to fasten the inflator 31, together with the airbag 40, to the side frame portion 17 (see FIG. 3). Most of the retainer 32 is formed by bending a plate such as a metal plate into a cylindrical shape that extends substantially in the up-down direction. The retainer 32 has an open end 32A at least at the lower end. The retainer 32 has a window 33 at a position in front of the gas outlet 31A. A considerable amount of inflation gas discharged from the inflator 31 is delivered to the exterior (downward and forward) of the retainer 32 through the open end 32A and the window 33. The first embodiment is configured such that a greater amount of inflation gas is discharged from the open end 32A than from the window 33.

Bolts 34 are fixed to the retainer 32. The bolts 34 serve as securing members for attaching the retainer 32 to the side frame portion 17. In other words, the bolts 34 are indirectly fixed to the inflator 31 by means of the retainer 32.

The inflator 31 and the retainer 32 of the inflator assembly 30 may be integrated.

As shown in FIGS. 1 and 2, the outer shape of the airbag 40 is formed by an airbag main body 41.

<Airbag Main Body 41>

If an impact is applied to the body side portion 11 of the vehicle 10 due to a side collision or the like when the vehicle 10 is, for example, travelling, the inflator 31 supplies inflation gas to the airbag main body 41. The airbag main body 41 is projected forward from the seat back 14 with a part of the airbag main body 41 remaining in the seat back 14. The airbag main body 41 is configured to be deployed and inflated in the vicinity of the occupant P seated in the vehicle seat 12 to restrain and protect the occupant from the impact.

FIG. 4 shows the airbag module AM in the state in which the airbag main body 41 is deployed in a planar form without being filled with inflation gas (hereinafter, referred to as an uninflated and deployed state). FIG. 5A shows, together with the occupant P, the airbag module AM in which the airbag main body 41 in the uninflated and deployed state of FIG. 4 is cut at the center portion of the vehicle widthwise direction to show the internal structure of the airbag module AM.

As shown in FIGS. 4 and 5A, the airbag main body 41 is formed by folding a single fabric piece (also referred to as a base fabric, or a fabric panel) along a folding line 42 set at the center portion to be overlapped in the widthwise direction of the vehicle seat 12 (the vehicle widthwise direction), and joining the overlapped portions into a bag shape. In the present embodiment, to distinguish the two overlapped portions of the airbag main body 41, the part located on the inner side is referred to as a main body fabric portion 43 (see FIG. 5A), and the part located on the outer side is referred to as a main body fabric portion 44 (see FIG. 4).

In the first embodiment, the fabric piece is folded in half such that the folding line 42 is located at the rear end of the airbag main body 41. However, the fabric piece may be folded in half such that the folding line 42 is located at another end such as the front end, the upper end, or the lower end. The airbag main body 41 may also be formed of two fabric pieces divided along the folding line 42. In this case, the airbag main body 41 is formed by overlapping the two fabric pieces in the widthwise direction of the vehicle seat 12 (the vehicle widthwise direction), and joining the fabric pieces into a bag shape. Furthermore, the airbag main body 41 may be formed of three or more fabric pieces.

In the airbag main body 41, the outer shapes of the main body fabric portions 43, 44 are symmetric with respect to the folding line 42 (see FIG. 6). The shape and size of the main body fabric portions 43, 44 are set to be able to occupy the region corresponding to most part of the upper body of the occupant P seated on the vehicle seat 12 (the section from a lumbar region PP to a shoulder region PS) when the airbag main body 41 is deployed and inflated between the vehicle seat 12 and the body side portion 11.

The main body fabric portions 43, 44 are preferably formed of a material having high strength and flexibility to be easily folded. The material may be, for example, woven cloth formed of polyester threads or polyamide threads.

The main body fabric portions 43, 44 are joined at peripheral joint portion 45 provided at the peripheries of the main body fabric portions 43, 44. In the first embodiment, most of the peripheral joint portion 45 is formed by sewing with sewing threads a part of the peripheries of the main body fabric portions 43, 44 except the rear end (the part in the vicinity of the folding line 42). These features are common to an endless joint portion 48, annular joint portions 53, outer joint portions 72, 84, 85, inner joint portions 73, 93, 145 and joint portions 76, 77, which will be discussed below.

Three types of lines represent sewing portions in FIGS. 4 to 10, 16, and 19 to 24. The first type of line includes thick lines with a certain length arranged intermittently (a kind of broken line), and represents sewn portions as viewed from the side (refer to the peripheral joint portion 45 in FIG. 4). The second type of line includes thin lines with a certain length (longer than a typical broken line) arranged intermittently (a kind of broken line), and represents the state of the sewing threads that are located behind, for example, the outer side main body fabric portion 44 and cannot be seen directly, or is hidden (refer to an inner joint portion 93 in FIG. 5A). The third type of line includes dots arranged at predetermined intervals (a kind of a broken line), and represents the state of the sewing thread at the position between the main body fabric portions 43, 44, which are the target of sewing, and between structural fabric portions 66, 69 (see the peripheral joint portion 45 in FIG. 5A). That is, the drawings in which the sewn part is represented by the third type of line show the structure along the cross-section that passes through the sewn portion.

As shown in FIGS. 4 to 6, the space between the main body fabric portions 43, 44 and surrounded by the peripheral joint portion 45 serves as an inflation portion 46. When being deployed and inflated by inflation gas beside the upper body of the occupant P, the inflation portion 46 restrains the most part of the upper body and protects the upper body from the impact.

The peripheral joint portion 45 may be formed by method other than sewing using sewing thread as shown above, but may be formed by, for example, using an adhesive. These features are common to an endless joint portion 48, annular joint portions 53, outer joint portions 72, 84, 85, inner joint portions 73, 93, and joint portions 76, 77, which will be discussed below.

Figure 7:
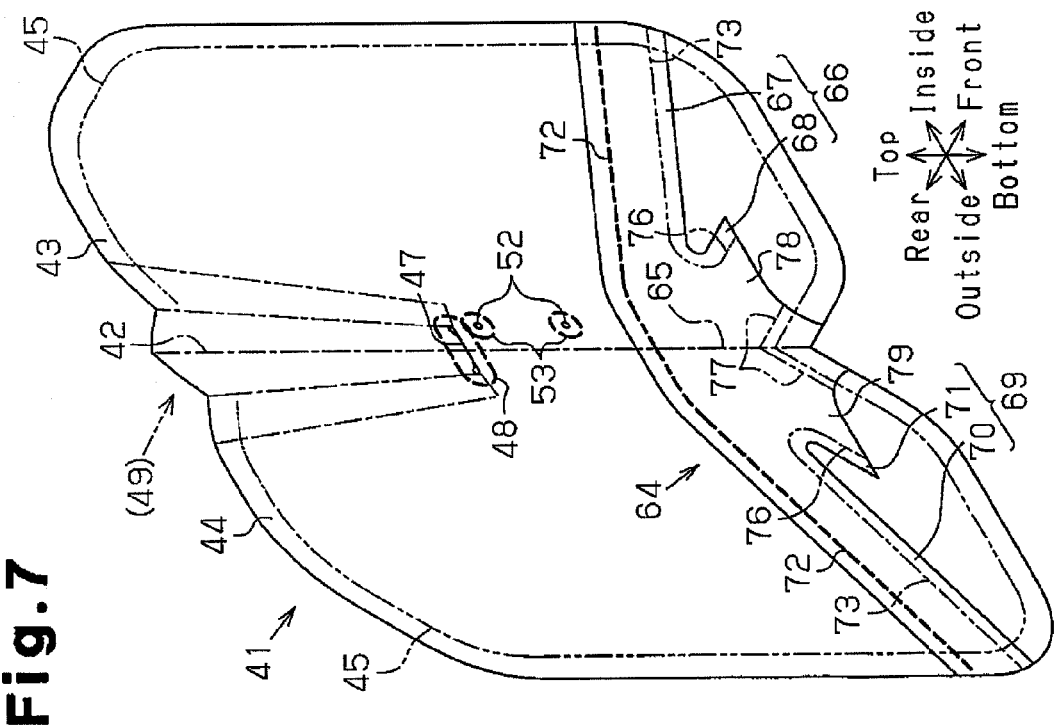
FIG. 7 is an explanatory perspective view showing a first joining step of the airbag according to the first embodiment.

The main body fabric portions 43, 44 have a slit 47, which is located at the rear end and in a middle portion in the up-down direction (see FIG. 7). The slit 47 extends in a direction perpendicular to and over the folding line 42. The main body fabric portions 43, 44 also have the endless joint portion 48 about the slit 47. The endless joint portion 48 reinforces the part about the slit 47 in the main body fabric portions 43, 44, thereby preventing the part from being torn.

A part of the main body fabric portions 43, 44 above the slit 47 forms an inward folding portion 49, which is folded inward of the remaining parts. The upper end of the inward folding portion 49 is joined to the remaining parts of the main body fabric portions 43, 44 by the above described peripheral joint portion 45. When the inward folding portion 49 is formed, the slit 47 is opened substantially in a circular shape to form an insertion port 51 for the inflator assembly 30.

The inner side main body fabric portion 43 has bolt holes 52 (the number of which is two in the present embodiment), which are located in the vicinity of the folding line 42 and below the slit 47. The bolts 34 of the retainer 32 (see FIG. 3) are passed through the bolt holes 52. An annular joint portion 53 is provided about each bolt hole 52. The annular joint portions 53 reinforce the parts about the bolt holes 52 in the main body fabric portion 43, thereby preventing these parts from being torn.

As shown in FIG. 5A, the inflation portion 46 is divided into a first inflation chamber 61, which is deployed and inflated by being supplied with inflation gas, a second inflation chamber 62, which is located in front of the first inflation chamber 61 with a vertical partition 81 in between, and a third inflation chamber 63, which is located below the first and second inflation chambers 61, 62 with a lateral partition 64 in between. The vertical partition 81 and the lateral partition 64 each have the same structure as a member generally referred to as a tether.

The lateral partition 64 corresponds to a first partition. The vertical partition 81 corresponds to a second partition. The first inflation chamber 61, the second inflation chamber 62, and the third inflation chamber 63 correspond to a plurality of inflation chambers.

<Lateral Partition 64>

As shown in FIGS. 5A, 5B, and 6, the lateral partition 64 is formed by folding a single fabric piece along a folding line 65 set at the center portion to be overlapped in the widthwise direction of the vehicle seat 12 (the vehicle widthwise direction), and installing the overlapped portions to extend between lower parts of the main body fabric portions 43, 44. The lower parts of the main body fabric portions 43, 44 are parts corresponding to the boundary between the lumbar region PP and the thorax PT of the occupant P. The fabric piece is preferably formed of material having high strength and flexibility such as a woven fabric so that it can be easily folded.

The lateral partition 64 may also be formed of two fabric pieces divided along the folding line 65.

Irrespective of the number of fabric pieces forming the lateral partition 64, the lateral partition 64 has a sufficient width for being installed to extend between the main body fabric portions 43, 44 in an inflated state.

Figure 14:
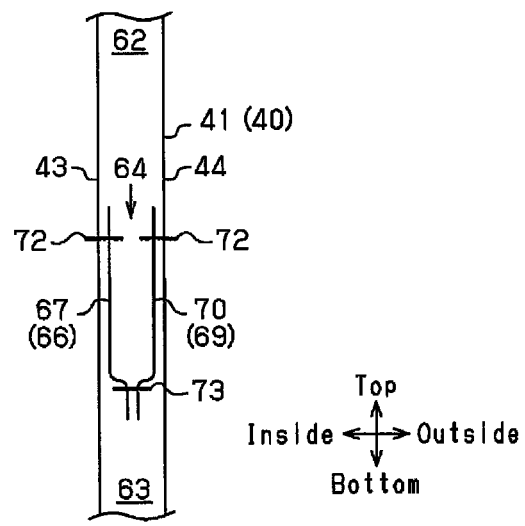
FIG. 14 is a partial cross-sectional view taken along line 14-14 of FIG. 13, schematically showing the internal structure of the airbag.

To distinguish the two overlapped portions of the lateral partition 64, the part located on the inner side is referred to as a structural fabric portion 66, and the part located on the outer side is referred to a structural fabric portion 69 (see FIG. 14).

The main part of the inner side structural fabric portion 66 is formed by a main body forming fabric portion 67, which extends from the rear end to the front end of the main body fabric portion 43. The main body forming fabric portion 67 is inclined to be lowered toward the front end. In addition to the main body forming fabric portion 67, the structural fabric portion 66 includes an extension 68, which extends forward and downward from the rear end of the main body forming fabric portion 67.

The main part of the outer side structural fabric portion 69 is formed by a main body forming fabric portion 70, which extends from the rear end to the front end of the main body fabric portion 44. The main body forming fabric portion 70 is inclined to be lowered toward the front end. In addition to the main body forming fabric portion 70, the structural fabric portion 69 includes an extension 71, which extends forward and downward from the rear end of the main body forming fabric portion 70.

Figure 18:
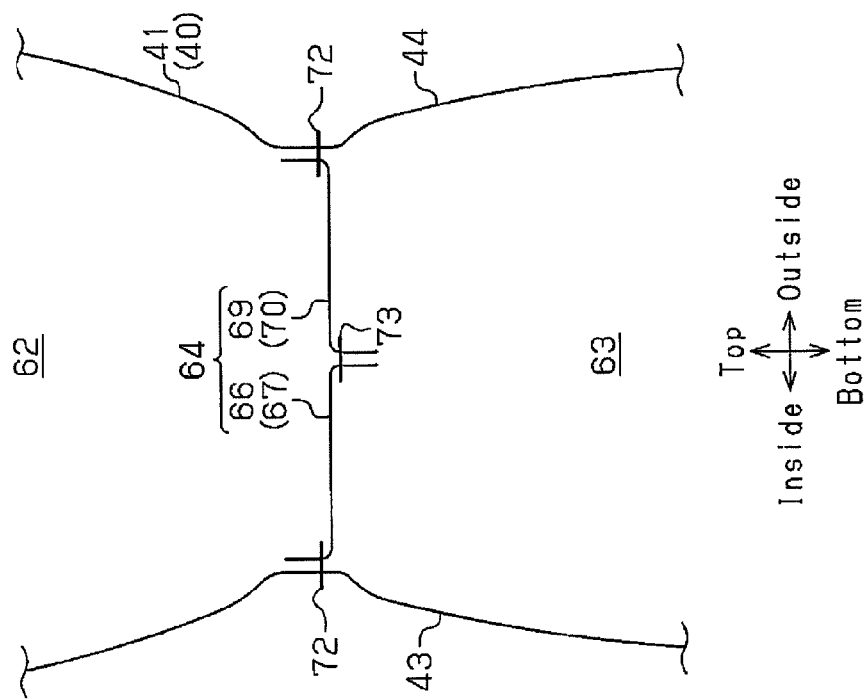
FIG. 18 is a partial cross-sectional view corresponding to FIG. 14, schematically showing the internal structure of the airbag when the lateral partition is tensed.

The lateral partition 64, which is folded in half as described above, is located between the main body fabric portions 43, 44 with the folding line 65 matched with the folding line 42 (see FIGS. 14 and 18). The inner side main body forming fabric portion 67 has an outer joint portion 72 formed along the upper periphery. The inner side main body forming fabric portion 67 is joined to the inner side main body fabric portion 43 by the outer joint portion 72. Likewise, the outer side main body forming fabric portion 70 has an outer joint portion 72 formed along the upper periphery. The outer side main body forming fabric portion 70 is joined to the outer side main body fabric portion 44 by the outer joint portion 72. Further, the main body forming fabric portions 67, 70 are joined to each other by an inner joint portion 73 located at the lower peripheries. When the lateral partition 64 is tensed, upper parts of the main body forming fabric portions 67, 70 are brought closer to the main body fabric portions 43, 44. In the same state, lower parts of the main body forming fabric portions 67, 70 are separated away from the main body fabric portions 43, 44.

Further, the front ends of the main body forming fabric portions 67, 70 are joined to (sewn together with) the front ends of the main body fabric portions 43, 44 by the peripheral joint portion 45 (refer to FIGS. 5A and 5B). A space of the inflation portion 46 below the lateral partition 64 forms the third inflation chamber 63, which is deployed and inflated beside the lumbar region PP of the occupant P seated in the vehicle seat 12.

When the inflation portion 46 is deployed and inflated, the lateral partition 64 is tensed in the widthwise direction of the vehicle seat 12 (the vehicle widthwise direction) to limit the thickness of the inflation portion 46 in the same direction (see FIG. 18).

<Vertical Partition 81>

Figure 11:
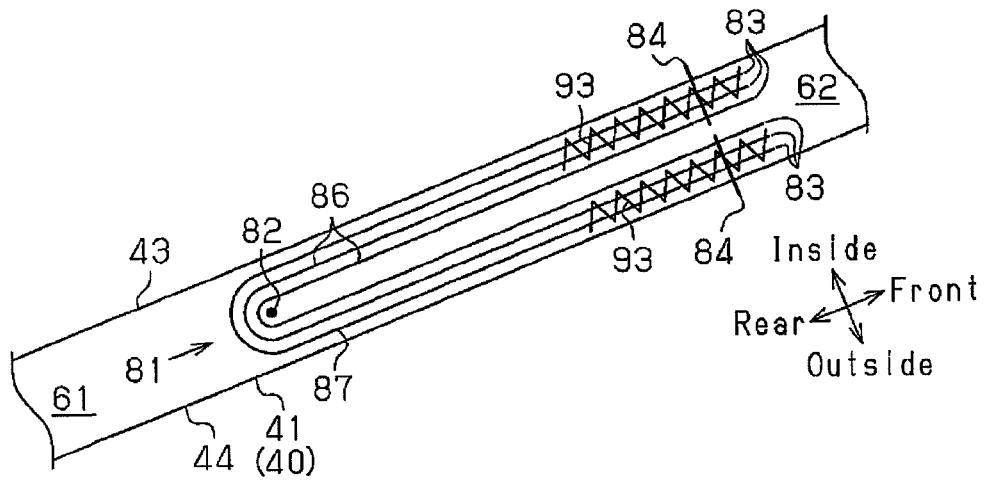
FIG. 11 is a partial cross-sectional view taken along line 11-11 of FIG. 4, schematically showing the internal structure of the airbag.
Figure 12:
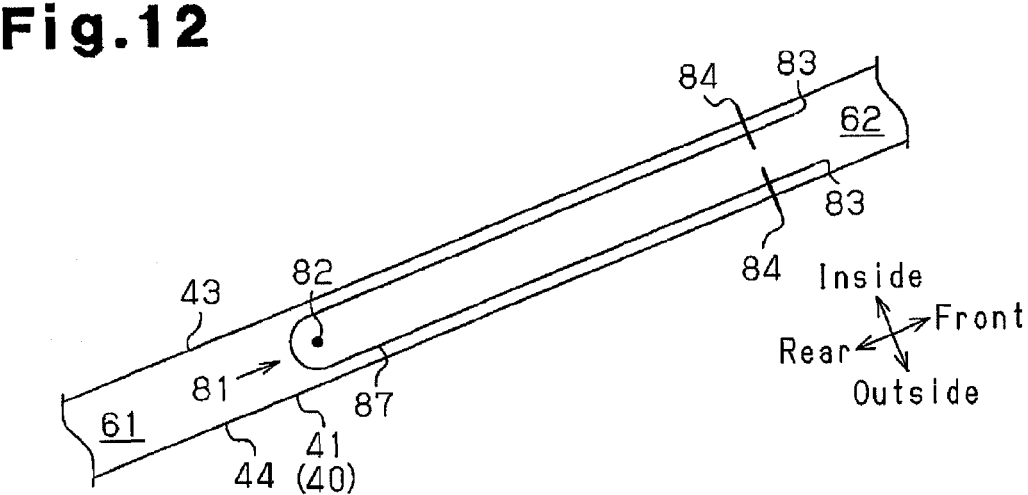
FIG. 12 is an enlarged partial cross-sectional view taken along line 12-12 of FIG. 4, schematically showing the internal structure of the airbag.
Figure 13:
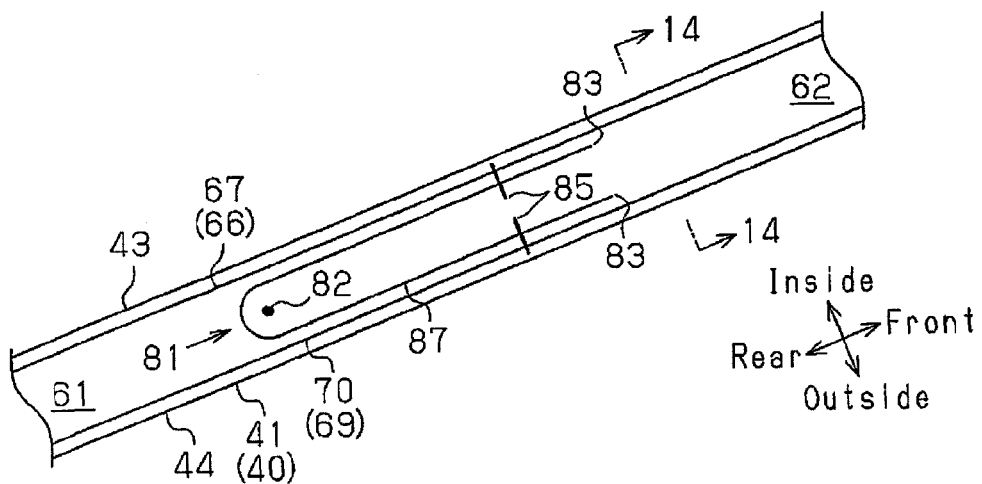
FIG. 13 is an enlarged partial cross-sectional view taken along line 13-13 of FIG. 4, schematically showing the internal structure of the airbag.
Figure 16:
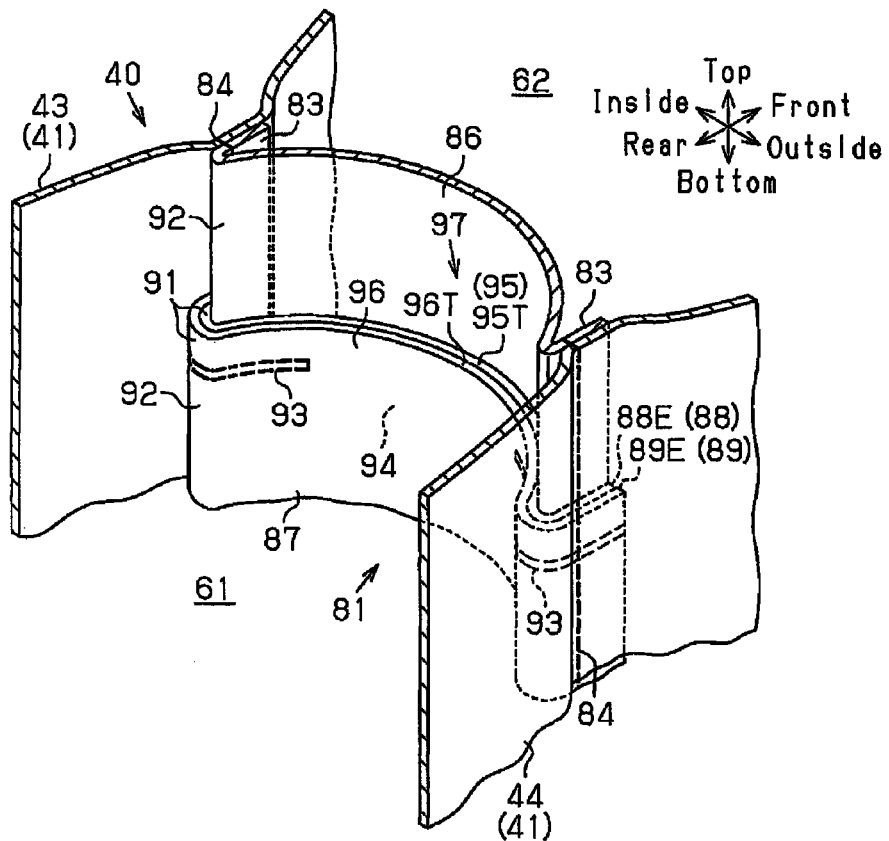
FIG. 16 is a partial perspective view showing a pressure regulator valve and the surroundings when the vertical partition of the first embodiment is tensed.

FIG. 11 shows a cross-sectional structure taken along line 11-11 of FIG. 4, and FIG. 12 shows a cross-sectional structure taken along line 12-12 of FIG. 4. FIG. 13 shows a cross-sectional structure taken along line 13-13 of FIG. 4, and FIG. 14 shows a cross-sectional structure taken along line 14-14 of FIG. 13. In FIGS. 11 to 14, the thickness of each component is omitted. The inner joint portions 93 are represented as zigzag lines in FIG. 11. As shown in FIG. 16, the vertical partition 81 has a sufficient width for being installed to extend between the main body fabric portions 43, 44 in an inflated state. As shown in FIGS. 5A, 5B, 11, and 12, when the airbag main body 41 is in the uninflated and deployed state, the vertical partition 81 is folded in half along a folding line 82, which extends in the up-down direction, between the main body fabric portions 43, 44, so that two outer peripheral portions 83 are brought close to each other. The folded vertical partition 81 is arranged in the inflation portion 46 (between the main body fabric portions 43, 44) with the folding line 82 located upstream of the peripheral portions 83. The vertical partition 81 extends substantially in the up-down direction, which intersects with the lateral partition 64.

In the present description, regarding the flowing direction of inflation gas, the side closer to the inflator assembly 30 is referred to as the upstream side, while the side farther away from the inflator assembly 30 is referred to as the downstream side.

Figure 8:
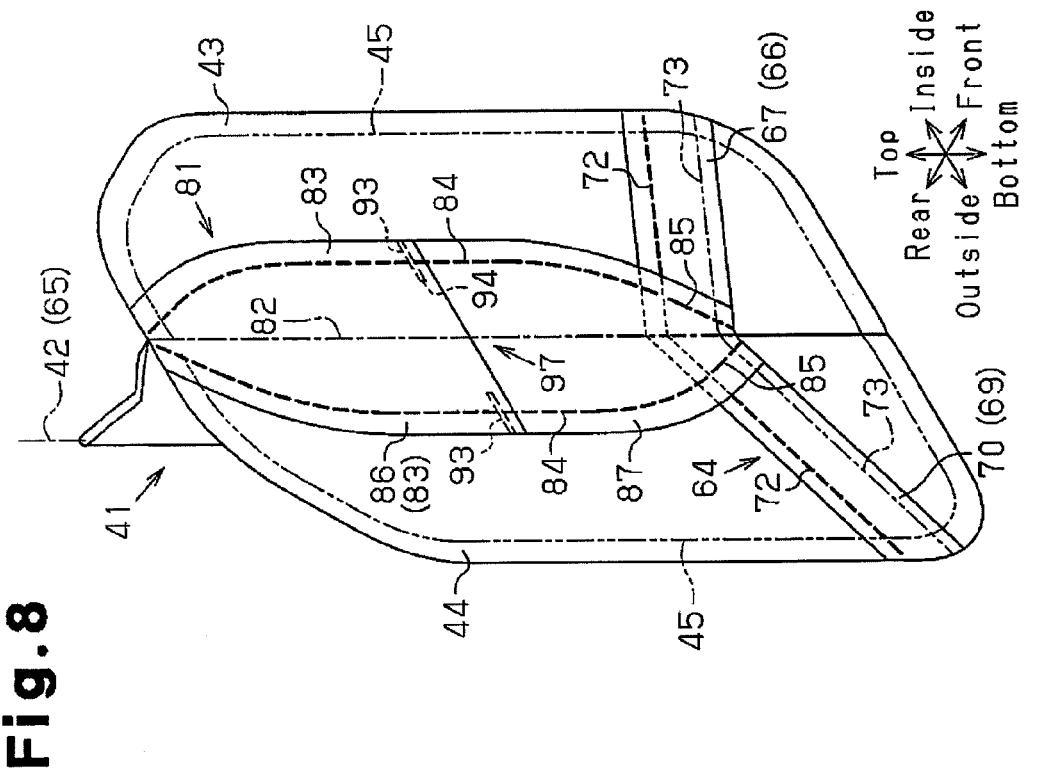
FIG. 8 is an explanatory perspective view showing a second joining step of the airbag according to the first embodiment.

As shown in FIGS. 4 and 8, the folded vertical partition 81 is joined to the airbag main body 41 at the upper end, or an upper extended end. That is, the upper end of the vertical partition 81 is joined to (sewn together with) the upper ends of the main body fabric portions 43, 44 by the peripheral joint portion 45.

Also, the folded vertical partition 81 is arranged between the structural fabric portions 66, 69 at the lower end, or a lower extended end, and overlaid onto the rear parts of the main body forming fabric portions 67, 70. The lower end of the folded vertical partition 81 is joined to (sewn together with) the main body forming fabric portions 67, 70 of the lateral partition 64 by the inner joint portion 73.

As shown in FIG. 6, the dimension of the vertical partition 81 in the direction of the folding line 82 (hereinafter, referred to as a vertical direction) is longer than the dimension in the direction perpendicular to the folding line 82 (hereinafter, referred to as a lateral direction). As shown in FIG. 8, parts of the vertical partition 81 that are not overlaid onto the main body forming fabric portions 67, 70 are joined to the main body fabric portions 43, 44 by outer joint portions 84 provided along a pair of outer peripheral portions 83. Parts of the deployed vertical partition 81 that are overlaid onto the main body forming fabric portions 67, 70 are joined only to the main body forming fabric portions 67, 70 by outer joint portions 85 provided along the lower parts of the peripheral portions 83 (see FIG. 13).

The vertical partition 81 is installed to extend between the main body fabric portions 43, 44 by the above described joining operation. When the airbag main body 41 is in the uninflated and deployed state, the vertical partition 81 is folded in half (see FIGS. 5A, 5B and 11 to 13). When the first inflation chamber 61 is deployed and inflated, the vertical partition 81 is tensed in the lateral direction (the vehicle widthwise direction, refer to FIG. 16) to limit the thickness of the first inflation chamber 61.

When inflation chambers in the inflation portion 46 that are above the lateral partition 64 is deployed and inflated, the vertical partition 81 is located in the vicinity of the boundary between the rear half and the front half of the upper body of the occupant P. An inflation chamber that is above the lateral partition 64 and rearward of the vertical partition 81 forms the first inflation chamber 61, to which inflation gas from the inflator 31 is first supplied. An inflation chamber forward of the vertical partition 81 forms the second inflation chamber 62. The first inflation chamber 61 is deployed and inflated beside the shoulder region PS and the rear half of the thorax PT of the occupant P, thereby restraining and protecting the shoulder region PS and the rear half of the thorax PT. The second inflation chamber 62 is deployed and inflated beside the front half of the thorax PT, thereby restraining and protecting the front half of the thorax PT.

As illustrated in FIGS. 8 and 16, the vertical partition 81 has two fabric pieces 86, 87, which are arranged in the vertical direction (the up-down direction). The vertical partition 81 is formed of a material such as woven fabric having high strength and flexibility to be easily folded.

As shown in FIGS. 5B and 16, the upper and lower fabric pieces 86, 87 are overlaid onto each other in a band-like shape with the edges 88E, 89E thereof being aligned with each other. The upper and lower fabric pieces 86, 87 are joined to each other at the inner joint portions 93, which extend in the lateral direction (the vehicle widthwise direction) at the boundary between the band-like overlapping portions 91 and the remaining parts (hereinafter, referred to as non-overlapping portions 92). The boundary is displaced from the edges 88E, 89E in one of the upward and downward directions (the downward direction in the first embodiment) by a predetermined distance.

As shown in FIG. 5A, most of the inflator assembly 30 is arranged to extend substantially in the up-down direction when accommodated in the rear end portion of the airbag main body 41. The upper portion of the inflator assembly 30 extends through insertion port 51 to be exposed to the outside of the airbag main body 41. The bolts 34 of the retainer 32 are passed through the bolt holes 52 (see FIG. 6). The insertion of the bolts 34 engages the inflator assembly 30 to the airbag main body 41 in a state where the position is determined with respect the airbag main body 41. In this state, the gas outlet 31A is located at a position that is rearward of the first inflation chamber 61 and in the vicinity of the third inflation chamber 63.

The lateral partition 64 has an opening 74 and a check valve 75, and the vertical partition 81 has an opening 94 and a pressure regulator valve 97.

<Opening 74 and Check Valve 75>

As shown in FIGS. 5A, 5B, and 6, the opening 74 connects, in the inflation portion 46, the inflation chamber below the lateral partition 64 (the third inflation chamber 63) with an inflation chamber above the lateral partition 64 (the first inflation chamber 61).

The inner joint portion 73 of the lateral partition 64 is disjoined in rear parts of the main body forming fabric portion 67, 70. In other words, the inner joint portion 73, which joins the main body forming fabric portions 67, 70 to each other, is absent in an area including the folding line 65. In this manner, the opening 74 is formed by a disjoined part where the inner joint portion 73 is not provided.

The check valve 75 is configured to restrict the flow of inflation gas at the opening 74. That is, the check valve 75 allows inflation gas to flow from the first inflation chamber 61 to the third inflation chamber 63, but restricts the flow in the opposite direction.

Front peripheries of the folded extensions 68, 71 are joined to each other by the joint portions 76 formed along the peripheries. The upper end of the joint portion 76 is connected to the rear end of the joint portion 73. Rear parts of the folded extensions 68, 71 are joined to each other by the joint portions 77 formed along the rear peripheries. The joint portions 76, 77 are inclined to be lowered toward the front ends. Further, parts of the folded extensions 68, 71 that are rearward of the joint portions 77 joined to (sewn together with) the rear lower ends of the main body fabric portions 43, 44 by the folded extensions 68, 71. A part of the inner side extension 68 that is surrounded by the opening 74 and the joint portions 76, 77 forms a valve body 78 of the check valve 75. Also, a part of the outer side extension 71 that is surrounded by the opening 74 and the joint portions 76, 77 forms a valve body 79 of the check valve 75. The check valve 75 allows flow of inflation gas when one of the valve bodies 78, 79 is separated from the other. This state of the check valve 75 is referred to as a valve opening state. The check valve 75 restricts flow of inflation gas when the valve bodies 78, 79 contact each other in at least parts thereof. This state of the check valve 75 is referred to as a valve closing state.

<Opening 94 and Pressure Regulator Valve 97>

As shown in FIGS. 5A, 5B, and 16, the opening 94 and the pressure regulator valve 97 are located substantially at a center in the vertical direction and the lateral direction. Specifically, the inner joint portion 93 in the vertical partition 81 is disjoined at a part (an area including the folding line 82 in the first embodiment). In other words, the inner joint portion 93, which joins the upper and lower fabric pieces 86, 87 to each other, is absent at a part that extends across the folding line 82 in the boundary between the overlapping portions 91 and the non-overlapping portions 92. A disjoined part where the inner joint portion 93 is not provided forms an opening 94, which is a slit that extends in the lateral direction (the vehicle widthwise direction) and connects the first inflation chamber 61 and the second inflation chamber 62 to each other. The lateral direction (the vehicle widthwise direction) is the same as the direction in which the impact is applied to the vehicle 10.

The pressure regulator valve 97 adjusts the flow of inflation gas at the opening 94, thereby regulating the internal pressures in the first inflation chamber 61 and the second inflation chamber 62. More specifically, the pressure regulator valve 97 is closed before the first inflation chamber 61 is inflated and restrains the occupant P, thereby restricting the outflow of inflation gas from the first inflation chamber 61 to the second inflation chamber 62 through the opening 94. When the first inflation chamber 61 restrains the occupant P, the pressure regulator valve 97 opens in response to a change in the tensed state of the vertical partition 81 due to the applied external force generated by the restraint, thereby cancelling the restraint.

A part of the overlapping portion 91 that is between the opening 94 and the edge 88E forms a valve body 95 of the pressure regulator valve 97, and a part of the overlapping portion 91 that is between the opening 94 and the edge 89E forms a valve body 96 of the pressure regulator valve 97. When the valve bodies 95, 96 contact each other at least partially, for example, at the distal ends 95T, 96T, the flow of the inflation gas through between the valve bodies 95, 96 is restricted (see FIGS. 17A, 17B). This state of the pressure regulator valve 97 is referred to as a valve closing state. Also, when the opening 94 is opened, and the entire valve body 95 is separated from the entire valve body 96, inflation gas is allowed to flow through between the valve bodies 95, 96 (see FIG. 17C). This state of the pressure regulator valve 97 is referred to as a valve opening state.

Further, the overlapping portions 91, which have the valve bodies 95, 96, are located in the first inflation chamber 61 before the inflation portion 46 is deployed and inflated.

At the boundary between the overlapping portions 91 and the non-overlapping portions 92, the overlapping portions 91 are folded upward or downward (upward in the first embodiment) to be overlaid onto one of the non-overlapping portions 92. Further, the folded band-like overlapping portions 91 are joined to (sewn together with) the main body fabric portions 43, 44 of the airbag main body 41 and the non-overlapping portions 92 at the ends in the direction along the inner joint portion 93 (the lateral direction, the vehicle widthwise direction) by the outer joint portions 84 (see FIGS. 5A and 8).

The airbag 40 of the first embodiment is constructed as described above. A method for manufacturing the airbag 40 will now be described with reference to FIGS. 7 to 10. Particularly, a method for installing the lateral partition 64 and the vertical partition 81 to extend between the main body fabric portions 43, 44 will be described. In the manufacture, the following first to fourth joining steps are sequentially performed.

<First Joining Step>

As shown in FIG. 7, the airbag main body 41 and the lateral partition 64 are spread in the first joining step. The slit 47, the endless joint portion 48, the bolt holes 52, and the annular joint portions 53 are formed in the airbag main body 41 in advance.

With the folding line 65 matched with the folding line 42, the lateral partition 64 is overlaid onto a lower part of the airbag main body 41. Specifically, the inner side structural fabric portion 66 is overlaid onto a lower part of the corresponding main body fabric portion 43, and the outer side structural fabric portion 69 is overlaid onto a lower part of the corresponding main body fabric portion 44.

The inner side main body forming fabric portion 67 is sewn at its upper periphery to the main body fabric portion 43, and the outer side main body forming fabric portion 70 is sewn at its upper edge to the main body fabric portion 44. The outer joint portion 72 is thus formed. The outer joint portion 72 joins, to the spread main body fabric portions 43, 44, the upper periphery of each of the structural fabric portions 66, 69 that is located closer to the main body fabric portions 43, 44.

<Second Joining Step>

As shown in FIG. 8, the rear part of the airbag main body 41 and the rear part of the lateral partition 64 are folded in half along the folding lines 42, 65 in the second joining step (refer to FIG. 7). The airbag main body 41 except for the rear part and the lateral partition 64 except for the rear part are spread.

The spread vertical partition 81 is overlaid onto the partly spread airbag main body 41 and the partly spread lateral partition 64. Prior to the second joining step, the vertical partition 81 is formed by joining the upper and lower fabric pieces 86, 87 to each other by the inner joint portion 93 to form the opening 94 and the pressure regulator valve 97.

Parts of the peripheral portions 83 of the spread vertical partition 81 that are not laid on the structural fabric portions 66, 69 are sewn to the main body fabric portions 43, 44, so that a pair of the outer joint portions 84 is formed.

Also, parts of the peripheral portions 83 that are laid on the structural fabric portions 66, 69 are sewn only to the main body forming fabric portions 67, 70, so that a pair of the outer joint portions 85 is formed.

Through the second joining step, the vertical partition 81, which has the opening 94 and the pressure regulator valve 97, is installed to extend between the main body fabric portions 43, 44, and the extended ends (lower ends) on one side of the vertical partition 81 are coupled to the lateral partition 64 (refer to FIG. 13).

<Third Joining Step>

Figure 9:
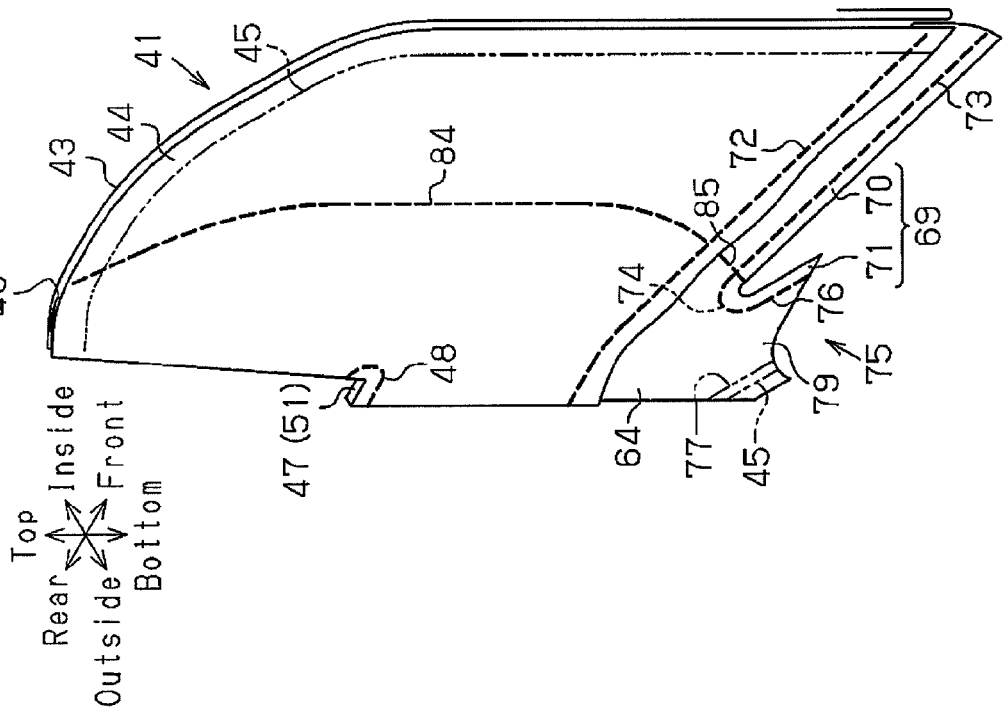
FIG. 9 is an explanatory partial perspective view, with a part of the main body fabric portion cut away, showing a third joining step of the airbag according to the first embodiment.

In the third joining step, the partly spread portions in the second joining step (the airbag main body 41, the lateral partition 64, and the vertical partition 81) are folded in half along the folding line 82 (see FIG. 8) as shown in FIG. 9. In this state, the lower peripheries of the main body forming fabric portions 67, 70 are sewn to each other to form the inner joint portion 73 and the opening 74. The front peripheries of the extensions 68, 71 are sewn together to form the joint portion 76, and the rear edges are sewn together to form the joint portion 77. As the joint portions 76, 77 are formed, the check valve 75, which has the valve bodies 78, 79, is formed. The lower peripheries, the front peripheries, and the rear peripheries of the main body forming fabric portions 67, 70 are peripheries on the side farther away from the main body fabric portions 43, 44 at the installation.

In this manner, in the process of joining the lower peripheries of the structural fabric portions 66, 69 (peripheries farther from the main body fabric portions 43, 44 when the lateral partition 64 is tensed), the opening 74, which connects upper and lower adjoining inflation chambers with the lateral partition 64 in between (the first inflation chamber 61 and the third inflation chamber 63) to each other, and the check valve 75, which selectively opens and closes the opening 74, are formed. That is, the third joining step not only joins the peripheries of the structural fabric portions 66, 69, but also forms the opening 74 and the check valve 75.

At the third joining step, as shown in FIG. 9, parts of the main body fabric portions 43, 44 that are below the outer joint portion 72 are folded upward and outward so that the lateral partition 64 is exposed. In FIG. 9, the outer side main body fabric portion 44 is shown with a part cut away.

The first to third joining steps do not include any particularly difficult process. Subsequent performance of sewing in each joining step installs the lateral partition 64 and the vertical partition 81, which are coupled to each other, to extend between the main body fabric portions 43, 44.

<Fourth Joining Step>

Figure 10:
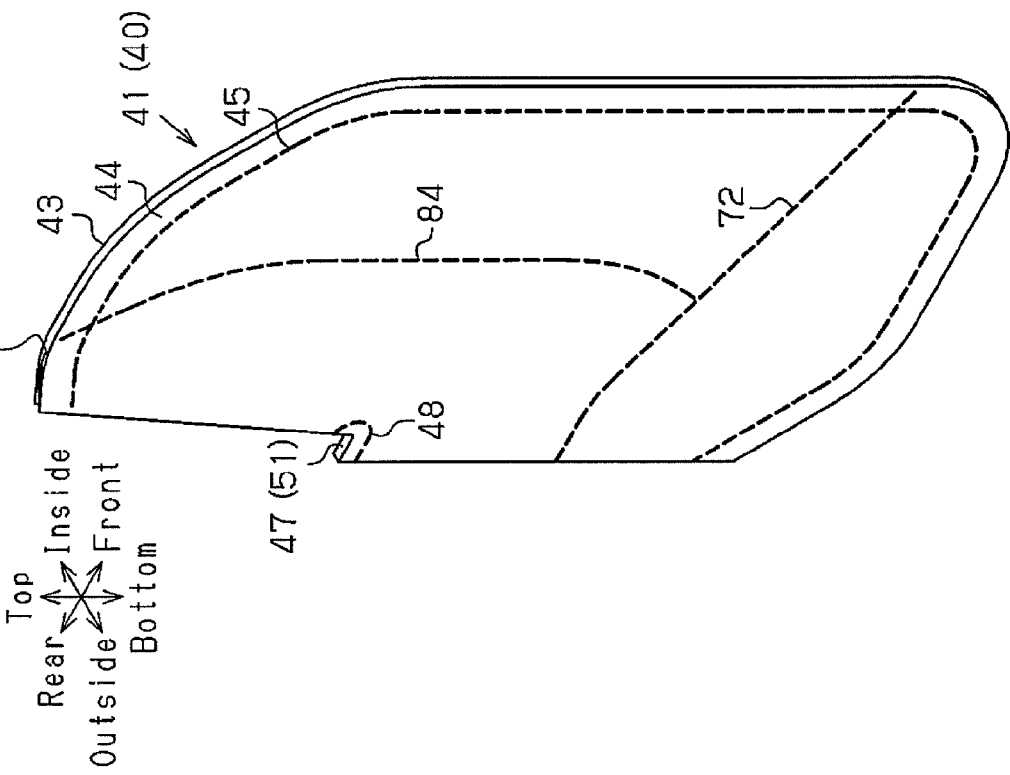
FIG. 10 is an explanatory perspective view showing a fourth joining step of the airbag according to the first embodiment.

In the fourth joining step, parts of the main body fabric portions 43, 44 that are above the slit 47 are folded into the remaining parts, so that the inward folding portion 49 is formed as shown in FIGS. 9 and 10. In this state, the peripheries of the main body fabric portions 43, 44 are sewn together to from the peripheral joint portion 45. The peripheral joint portion 45 joins the main body fabric portions 43, 44 to each other and joins (sews together) the upper end of the inward folding portion 49 to the remaining parts of the main body fabric portions 43, 44. In addition, the front ends of the main body forming fabric portions 67, 70 of the lateral partition 64 are joined to (sewn together with) the front ends of the main body fabric portions 43, 44. Also, the parts of the extensions 68, 71 that are rearward of the joint portion 77 are joined to (sewn together with) the rear lower ends of the main body fabric portions 43, 44. Further, the upper end of the folded vertical partition 81 is joined to (sewn together with) the upper ends of the main body fabric portions 43, 44.

In this manner, the airbag 40 is formed, in which the lateral partition 64 and the vertical partition 81 are installed to extend between the main body fabric portions 43, 44. As shown in FIG. 10, the peripheral joint portion 45, a part of the endless joint portion 48, and the outer joint portions 72, 84 are exposed as seams on the outer side main body fabric portion 44. In addition of these, the annular joint portions 53 are exposed as seams on the inner side main body fabric portion 43.

Since the airbag 40 (see FIGS. 4 to 5B) is folded as shown in FIG. 3, the airbag module AM, which includes the inflator assembly 30 and the airbag 40 as main components, is made into a compact stage form. The airbag module AM is folded in this manner in order that it is suitable for being accommodated in the storage portion 21 having a limited size in the seat back 14.

The bolts 34 extend from the retainer 32 and are passed through the main body fabric portion 43 of the airbag main body 41 and are passed through the side frame portion 17. A nut 35 is threaded onto each bolt 34. The fastening secures the inflator assembly 30 to the side frame portion 17 together with the airbag 40.

The inflator assembly 30 may be fixed to the side frame portion 17 of the vehicle 10 using members other than the bolts 34 and the nuts 35.

As shown in FIG. 1, the side airbag apparatus includes an impact sensor 121 and a controller 122 in addition to the above-described airbag module AM. The impact sensor 121 is formed by an acceleration sensor and is provided on the body side portion 11 of the vehicle 10 (see FIG. 2) to detect an impact applied from the side of the body side portion 11. The controller 122 controls the operation of the inflator 31 based on a detection signal from the impact sensor 121.

Furthermore, the vehicle 10 is equipped with a seat belt apparatus for restraining the occupant P seated on the vehicle seat 12. However, illustration of the seat belt apparatus is omitted in the drawings.

The side airbag apparatus of the first embodiment is constructed as described above. The typical operation mode will now be described as operation of the side airbag apparatus.

Figures 17A, 17B, 17C:
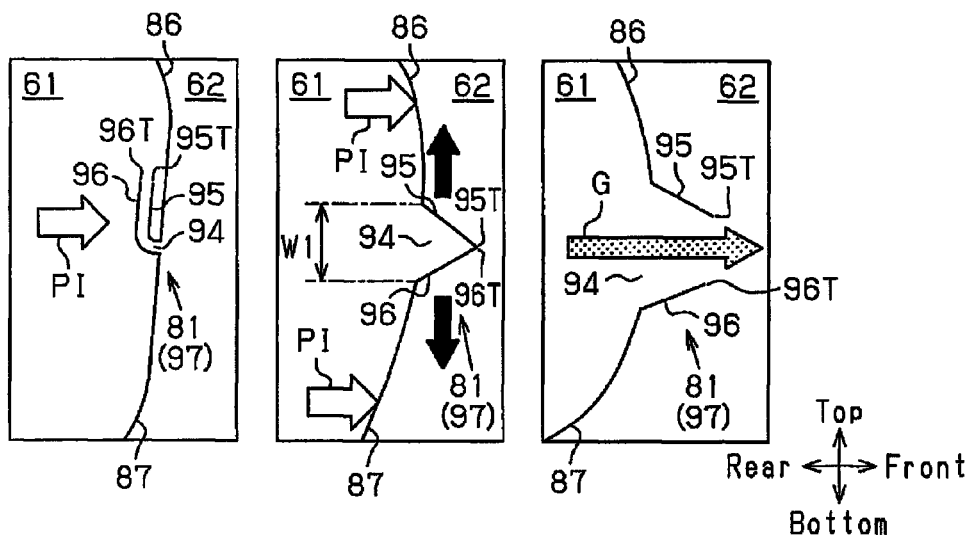
FIGS. 17A to 17C are cross-sectional side views schematically showing operation of the pressure regulator valve of the first embodiment.

FIGS. 17A to 17C schematically show the forms of the pressure regulator valve 97 and the vertical partition 81 being changed over time after the inflation gas starts to be supplied, and detailed parts are omitted or simplified.

In the side airbag apparatus, when no impact is applied to the body side portion 11 of the vehicle 10, the controller 122 sends no activation signal to the inflator 31, so that the inflator 31 does not supply inflation gas to the first inflation chamber 61. The airbag 40 thus remains stored in the storage portion 21 in the storage form (see FIG. 3).

In contrast, when the impact sensor 121 detects that an impact of a magnitude greater than or equal to a predetermined value has been applied to the body side portion 11 of the vehicle 10 due to a side collision while the vehicle 10 is running, the controller 122, based on the detection signal, sends an activation signal to the inflator 31 to activate the inflator 31 (see FIGS. 1 and 2). In response to the activation signal, the gas generating agent in the inflator 31 generates high temperature and high pressure inflation gas, which is discharged in the direction perpendicular to the axis of the inflator 31, that is, in the radial direction. Some of the inflation gas flows to the first inflation chamber 61 via the window 33 of the retainer 32, which is shown in FIG. 5A. The inflation gas thus starts inflating the first inflation chamber 61.

On the other hand, a greater amount of inflation gas than that is delivered to the first inflation chamber 61 is caused to flow toward the check valve 75 via the lower open end 32A of the retainer 32. During the period in which the inflator 31 supplies inflation gas to the check valve 75, a force that acts to separate the valve bodies 78, 79 from each other is generated in the valve bodies 78, 79. The inflation gas therefore flows into the third inflation chamber 63 through the opening 74 and through between the valve bodies 78, 79. The inflation gas thus starts inflating the third inflation chamber 63. The lateral partition 64 is pulled in the lateral direction (the vehicle widthwise direction) by the main body fabric portions 43, 44, which form the first inflation chamber 61 and the third inflation chamber 63 in the process of inflation. The continuous supply of the inflation gas from the inflator 31 increases the internal pressure of the third inflation chamber 63.

As the first inflation chamber 61 starts being inflated, the folded vertical partition 81 is pulled in the lateral direction (the vehicle widthwise direction) by the main body fabric portions 43, 44, which form the first inflation chamber 61 being inflated.

As shown in FIG. 17A, an internal pressure PI is applied to the valve bodies 95, 96 of the pressure regulator valve 97 in the overlapping direction (the thickness direction). The internal pressure PI is not as high as the internal pressure of the first inflation chamber 61 when restraining the occupant P or as the internal pressure of the third inflation chamber 63. The valve bodies 95, 96 are brought into close contact in the entire surfaces with each other by the internal pressure PI, and are in a self-sealing state, which restricts the flow of the inflation gas through between the valve bodies 95, 96. Furthermore, the overlapping portions 91, which has been folded and overlaid onto the non-overlapping portion 92 of the vertical partition 81, is pressed against the non-overlapping portion 92 by the internal pressure (see FIG. 16). This allows the valve bodies 95, 96 to be further easily closed.

As shown in FIG. 6, the vertical partition 81 is formed to be longer in the vertical direction (the up-down direction) than in the lateral direction (the vehicle widthwise direction). Thus, in the vertical partition 81, stronger tension tends to be applied in the lateral direction (the vehicle widthwise direction) than in the longitudinal direction (the up-down direction). In the first embodiment, since the opening 94 extends in the lateral direction (the vehicle widthwise direction), in which the strong tension tends to be applied, the opening 94 is easily closed.

Further, when the first inflation chamber 61 is deployed and inflated, strong tension is applied not only to the vertical partition 81 in the lateral direction (the vehicle widthwise direction), but also to the overlapping portions 91 in the same direction. This is because the ends of the overlapping portions 91 are joined to the main body fabric portions 43, 44.

When the valve bodies 95, 96 at least partially contact each other, the pressure regulator valve 97 is closed. The inflation gas in the first inflation chamber 61 is restricted from flowing into the second inflation chamber 62 through between the valve bodies 95, 96 and the opening 94. The restriction of gas flow causes the inflation gas to be accumulated in the first inflation chamber 61, so that the internal pressure of the first inflation chamber 61 is mainly increased.

In the first embodiment, since the upper space above the lateral partition 64 is divided into the front and rear two inflation chambers by the vertical partition 81, the volume of the first inflation chamber 61 is smaller than that in a case in which the space is not divided. Thus, the internal pressure of the first inflation chamber 61 starts to increase earlier and to a higher level than the case in which the upper space is not divided into two inflation chambers.

At this time, the inflation portion 46 is yet to contact the occupant P.

Figure 15:
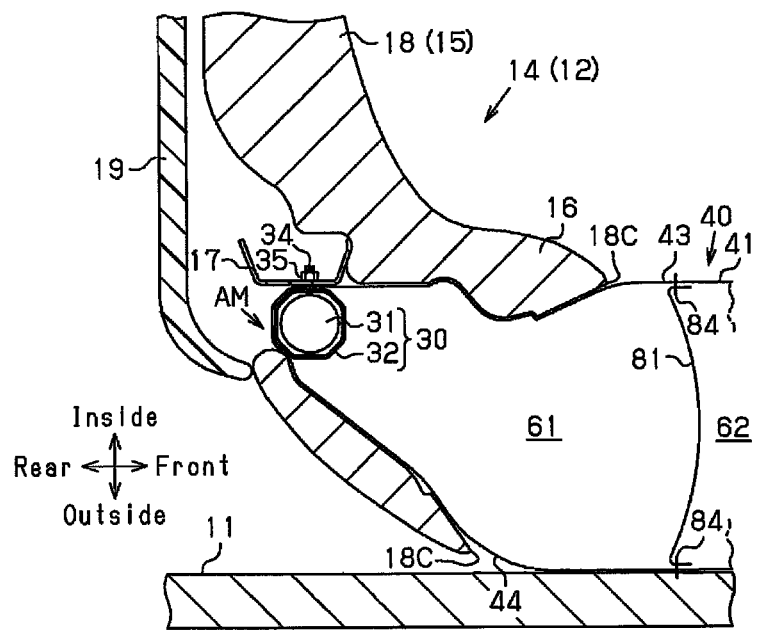
FIG. 15 is a partial cross-sectional plan view illustrating a state in which the airbag main body of FIG. 3 has been projected from the vehicle seat to be deployed and inflated with a part remaining in the seat back.

The internal pressure increase inflates the first inflation chamber 61 and the third inflation chamber 63, while unfolding (deploying) these inflation chambers 61, 63 in the reverse order of the folding order. Then, the seat pad 18 of the seat back 14 is pushed by the first inflation chamber 61 and the third inflation chamber 63 and breaks at the breakable portion 23 (see FIG. 3). As shown in FIG. 15, the first inflation chamber 61 and the third inflation chamber 63 are projected forward from the seat back 14 through the broken part while parts thereof are remaining in the storage portion 21.

Subsequently, the first inflation chamber 61 and the third inflation chamber 63, which continue being supplied with the inflation gas, are deployed while being unfolded forward between the body side portion 11 and the upper body (the rear half of the shoulder region PS, the thorax PT, and the lumbar region PP) of the occupant P seated in the vehicle seat 12 as shown in FIG. 2. As shown in FIG. 5A, the third inflation chamber 63, the internal pressure of which is higher than that of the first inflation chamber 61, is deployed and inflated beside the lumbar region PP. Also, the first inflation chamber 61, the internal pressure of which is lower than that of the third inflation chamber 63, is deployed and inflated beside the shoulder region PS and the rear half of the thorax PT. At this time, the second inflation chamber 62 is yet to be inflated or only slightly inflated with a low internal pressure.

As shown in FIG. 16, the vertical partition 81 is tensed when pulled in the lateral direction (the vehicle widthwise direction). The tensed vertical partition 81 limits the thickness of the inflated first inflation chamber 61 in the same direction. In this state, the thickness is greater than that in a case in which the inflation portion 46 is divided into the first inflation chamber 61 and the second inflation chamber 62 without using fabric pieces, that is, by using a means for sewing (what is typically referred to as a seam).

As shown in FIG. 18, the lateral partition 64 is tensed when pulled in the lateral direction (the vehicle widthwise direction). The lateral partition 64 limits the thickness of the inflated first and third inflation chambers 61, 63 in the lateral direction. In this state, the thickness is greater than that in a case in which the inflation portion 46 is divided into the first inflation chamber 61 and the third inflation chamber 63 without using fabric pieces, that is, by using a means for sewing (by using a seam).

When the body side portion 11 bulges further inward, the shoulder region PS of the occupant P starts being pushed toward the center of the vehicle by the first inflation chamber 61. As the first inflation chamber 61 pushes the shoulder region PS and the rear half of the thorax PT and as the third inflation chamber 63 pushes the lumbar region PP, the occupant P is moved inward and restrained. By this movement, the distance between the occupant P and the body side portion 11 is increased, and the space for deploying and inflating the second inflation chamber 62 is ensured.

At the pushing action by the inflation chambers, only the first inflation chamber 61 of the inflation chambers above the lateral partition 64 is deployed and inflated. The occupant P thus mostly contacts the first inflation chamber 61 while receiving the pressure of the inflation portion 46.

The inflation gas keeps being supplied to the first inflation chamber 61 with the valve bodies 95, 96 closely contacting each other in the entire surfaces and closed. At this time, external force applied from the body side portion 11 causes the pressure regulator valve 97 to start opening.

That is, the inflation portion 46 starts being deformed by external force that accompanies the restraint of the occupant P in the middle of the supplying period of the inflation gas to the inflation chambers above the lateral partition 64. Accordingly, the tension strongly applied to the vertical partition 81 in the lateral direction (the vehicle widthwise direction) is decreased, and the tension applied in the vertical direction is increased.

Also, the internal pressure of the first inflation chamber 61 is further increased in accordance with the deformation of the inflation portion 46, and the vertical partition 81 is pushed toward the second inflation chamber 62 (see FIG. 17B). Thus, the tension applied to the vertical partition 81 is changed. As the tension is changed, the difference between the tension acting in the vertical direction and the tension acting in the lateral direction is reduced. Then, the opening 94 in the vertical partition 81 is permitted to be deformed, and the valve bodies 95, 96 of the vertical partition 81 are permitted to operate.

The overlapping portions 91 are overlapped with the non-overlapping portions 92, and are joined to the main body fabric portions 43, 44 by the outer joint portions 84 at the ends in the lateral direction (the widthwise direction). Therefore, the force that acts to maintain the overlapped state is strong at the parts of the overlapping portions 91 close to the outer joint portions 84. However, the force is reduced as the distance from the outer joint portions 84 is increased, and the force is minimized at the center in the lateral direction (the vehicle widthwise direction), that is, on the valve bodies 95, 96. Thus, the overlapping portions 91, which are pulled in the vertical direction, are deformed in the vertical direction at the valve bodies 95, 96 and in the vicinity thereof.

When the opening 94 is opened in the vertical direction by a certain amount, only the valve bodies 95, 96 of the overlapping portions 91, which have received high internal pressure PI of the first inflation chamber 61, are pushed out into the second inflation chamber 62 via the opening 94 and reversed. When the vertical width W1 of the opening 94 is narrow, the distal ends 95T, 96T contact each other to close the pressure regulator valve 97.

Then, as the width W1 of the opening 94 increases, the distal ends 95T, 96T separate from each other to open the pressure regulator valve 97 as shown in FIG. 17C. At this time, the restriction of flow is cancelled so that the inflation gas G in the first inflation chamber 61 is permitted to flow to the second inflation chamber 62 via the opening 94 and between the valve bodies 95, 96.

As the inflation gas flows out, the internal pressure of the first inflation chamber 61 switches from increasing to decreasing. However, since the body side portion 11 continues bulging inward, the inflation portion 46 is pushed against the occupant P at the first inflation chamber 61.

Also, the second inflation chamber 62 starts being inflated by inflowing inflation gas, and the internal pressure of the second inflation chamber 62 starts increasing. This causes the second inflation chamber 62 to be unfolded in the reverse order of that in which it was folded.

At this time, the second inflation chamber 62 is deployed and inflated beside the front half of the thorax PT, which has a lower impact resistance than the shoulder region PS, with an internal pressure lower than that of the first inflation chamber 61. In this state, the first inflation chamber 61 and the third inflation chamber 63 have increased the space between the body side portion 11 and the occupant P, and the space for deploying and inflating the second inflation chamber 62 is ensured. Therefore, compared to a case in which such an increase in the space does not takes place, the second inflation chamber 62 can be easily deployed and inflated.

Slightly after the start of increase in the internal pressure of the second inflation chamber 62, the body side portion 11, which is bulging inward, starts pressing the second inflation chamber 62 against the upper body of the occupant P, in addition to the first inflation chamber 61. That is, the upper body starts being restrained by the second inflation chamber 62 in addition to the first inflation chamber 61.

Since the third inflation chamber 63 extends over the first inflation chamber 61 and the second inflation chamber 62, the third inflation chamber 63 is deployed and inflated not only below the first inflation chamber 61, but also below the second inflation chamber 62. Therefore, since the third inflation chamber 63 is deployed and inflated also below the second inflation chamber 62, the third inflation chamber 63 is deployed and inflated forward in a wider range than in the case where the third inflation chamber 63 is deployed and inflated only below the first inflation chamber 61.

The airbag 40, in which the first inflation chamber 61, the second inflation chamber 62, and the third inflation chamber 63 are each deployed and inflated as described above, is located between the upper body of the occupant P and the inwardly bulging body side portion 11. The airbag 40 pushes the upper body inward of the vehicle and restrains the upper body. The side impact transmitted to the upper body through the body side portion 11 is reduced by the inflation portion 46 and the upper body is protected. Particularly, a range of the lumbar region PP that is large in the front-rear direction is restrained and protected by the third inflation chamber 63, which is deployed and inflated below both the first inflation chamber 61 and the second inflation chamber 62.

The impact resistance of the upper body of the occupant P is generally higher in the rear half of the upper body than in the front half. This is because the rear half includes the spine and the ribs are connected to the spine at the rear ends, while the front ends of the ribs are not connected to any structure having a strength as the spine. Therefore, as the inflation chambers above the lateral partition 64 are deployed and inflated, the internal pressure of the inflation portion 46 that acts on the side of the upper body of the occupant P is preferably lower in the front half than in the rear half.

In this respect, the inflation chambers above the lateral partition 64 are inflated such that the vertical partition 81 is located in the vicinity of the boundary between the front half and the rear half of the upper body with respect to the front-rear direction in the first embodiment. When the inflation portion 46 is deployed and inflated, the first inflation chamber 61 is located in the vicinity of the side of the rear half, and the second inflation chamber 62 is located in the vicinity of the side of the front half. Therefore, at an initial stage of the restraint of the occupant P by the airbag 40, the rear half, which has a higher impact resistance than the front half, is pushed by the first inflation chamber 61, the internal pressure of which is increased at an early stage. Also, at the initial stage of the restraint, the front half, which has a relatively low impact resistance, is pressed by the second inflation chamber 62, the internal pressure of which is not as increased as that of the first inflation chamber 61.

When the discharge of inflation gas from the inflator 31 stops and the inflation gas in the third inflation chamber 63 acts to flow to the first inflation chamber 61, the valve bodies 78, 79 of the check valve 75 are pushed by the high pressure in the third inflation chamber 63 and contact each other. When the check valve 75 is closed, the inflation gas in the third inflation chamber 63 is restricted from flowing back to the first inflation chamber 61 through between the valve bodies 78, 79 and the opening 74.

Therefore, the internal pressure of the third inflation chamber 63, which has been increased to a level adequate for protecting the lumbar region PP of the occupant P, is maintained at the high level. Thereafter, while allowing inflation gas to flow from the first inflation chamber 61 to the third inflation chamber 63, the check valve 75 restricts the inflation gas in the third inflation chamber 63 from flowing back to the first inflation chamber 61. Therefore, if, for example, the internal pressure of the third inflation chamber 63 is increased as the side airbag apparatus restrains the lumbar region PP of the occupant P, the check valve 75 restricts the inflation gas in the third inflation chamber 63 from flowing out to the first inflation chamber 61. The internal pressure of the first inflation chamber 61 is unlikely to be increased under the influence of pressure fluctuation of the third inflation chamber 63 that accompanies the restraint of the lumbar region PP.

The first embodiment as described above has the following advantages.

(1) The first to third joining steps are performed for installing the lateral partition 64 and the vertical partition 81 to extend between the main body fabric portions 43, 44. In the first joining step, the peripheries of the structural fabric portions 66, 69 that are located closer to the main body fabric portions 43, 44 are sewn to the spread main body fabric portions 43, 44 at the installation (FIG. 7). In the second joining step, parts of the outer peripheral portions 83 in the spread vertical partition 81 (the second partition) that are not overlapped with the structural fabric portions 66, 69 are joined to the main body fabric portions 43, 44, and parts that are overlapped with the structural fabric portions 66, 69 are joined only to the main body forming fabric portions 67, 70 (FIG. 8). In the third joining step, peripheral portions of the structural fabric portions 66, 69 that are separated away from the main body fabric portions 43, 44 are joined to each other at the installation (FIG. 9).

Therefore, the airbag 40 can be easily manufactured in which the inflation portion 46 is divided into multiple inflation chambers by the lateral partition 64 (the first partition), which is installed to extend between the main body fabric portions 43, 44, and the vertical partition 81 (the second partition), which is installed to extend between the main body fabric portions 43, 44 while contacting the lateral partition 64 (the first partition).

(2) In the third joining step, during the process for joining the peripheral portions of the structural fabric portions 66, 69 that are separated away from the main body fabric portions 43, 44 at the installation, the opening 74, which connects the first inflation chamber 61 and the third inflation chamber 63, which are adjacent to each other with the lateral partition 64 (the first partition) in between, and the check valve 75 for opening and closing the opening 74 are formed (see FIG. 9).

Therefore, the third joining step not only joins the peripheries of the structural fabric portions 66, 69, but also forms the opening 74 and the check valve 75.

(3) The vertical partition 81 (the second partition) used in the second joining step has the opening 94 for connecting the first inflation chamber 61 and the second inflation chambers 62, which are adjacent to each other with the vertical partition 81 in between, with each other and the pressure regulator valve 97 for opening and closing the opening (FIGS. 6 and 8).

Therefore, through the second joining step, the vertical partition 81 (the second partition), which has the opening 94 and the pressure regulator valve 97, is installed to extend between the main body fabric portions 43, 44, and the extended ends (lower ends) on one side of the vertical partition 81 (the second partition) are coupled to the lateral partition 64 (the first partition).

Second Embodiment

A method for manufacturing an airbag according to a second embodiment will now be described with reference to FIGS. 19 and 20.

A vertical partition 81 (the second partition) used in the second embodiment is made of a single fabric piece 131. The fabric piece 131 has a sufficient width for being installed to extend between the main body fabric portions 43, 44 in an inflated state. The vertical partition 81 (the second partition) has inner discharge holes 132, which connect the first inflation chamber 61 and the second inflation chamber 62 with each other. According to the second embodiment, the number of the inner discharge holes 132 is two, and the inner discharge holes 132 are located in the vicinity of the folding line 82 and face each other in a state where the vertical partition 81 (the second partition) is folded in half along the folding line 82. The vertical partition 81 (the second partition) has annular joint portions 133, each of which surrounds one of the inner discharge holes 132. The annular joint portions 133 reinforce parts about the inner discharge holes 132 of the vertical partition 81 (the second partition).

Unlike the first embodiment, the vertical partition 81 (the second partition) does not have the opening 94 or the pressure regulator valve 97.

Although not illustrated in the first embodiment, the airbag 40 (the airbag main body 41) has an outer discharge hole 134 (also referred to as a vent hole) for discharging excess gas in the inflation portion 46 to the outside of the airbag 40 (the airbag main body 41). In the second embodiment, the outer discharge hole 134 is located in a front part of and between the main body fabric portions 43, 44. The outer discharge hole 134 is formed by disjoining (cancelling the sewing of) the peripheral joint portion 45 at the part. In FIGS. 19 and 20, the airbag main body 41 has the single outer discharge hole 134, but may be have two or more outer discharge holes 134.

Other than these differences, the second embodiment is the same as the first embodiment. Thus, like or the same reference numerals are given to those components that are like or the same as the corresponding components described above in the first embodiment and detailed explanations are omitted.

When providing the lateral partition 64 and the vertical partition 81 between the main body fabric portions 43, 44 during the manufacture of the airbag 40, the first to fourth joining steps are sequentially performed as in the first embodiment. The contents of the joining steps are the same as those described in the first embodiment.

In the second joining step, the vertical partition 81 (the second partition) has the inner discharge hole 132 for connecting the first inflation chamber 61 and the second inflation chamber 62 to each other. Therefore, through the second joining step, the vertical partition 81 (the second partition), which has the inner discharge holes 132, is installed to extend between the main body fabric portions 43, 44, and the extended ends (lower ends) on one side of the vertical partition 81 (the second partition) are coupled to the lateral partition 64 (the first partition).

Operation of the side airbag apparatus, which is manufactured in above described manner, will now be described. The difference of the operation from that of the first embodiment is that pressure regulation by the opening 94 and the pressure regulator valve 97 is replaced by gas discharge via the inner discharge holes 132.

When an impact is applied to the vehicle 10 (the body side portion 11) due to a side collision or the like while the vehicle 10 is travelling, the inflator 31 discharges inflation gas, some of which is first supplied to the first inflation chamber 61. When the first inflation chamber 61 starts being inflated by the inflation gas, the internal pressure of the first inflation chamber 61 starts increasing. This causes the first inflation chamber 61 to be unfolded (deployed) in the reverse order of that in which it was folded.

Also, a greater amount of inflation gas than that is discharged by the inflator 31 and delivered to the first inflation chamber 61 is caused to flow into the third inflation chamber 63 via the check valve 75. When the third inflation chamber 63 starts being inflated by the inflation gas, the internal pressure of the third inflation chamber 63 is increased. This causes the third inflation chamber 63 to be unfolded (deployed) in the reverse order of that when it is folded.

From the middle of the deployment and inflation of the first inflation chamber 61, some of the inflation gas in the first inflation chamber 61 starts flowing to the second inflation chamber 62 via the inner discharge holes 132. When the second inflation chamber 62 starts being inflated by the inflation gas, the internal pressure of the second inflation chamber 62 starts increasing. This causes the second inflation chamber 62 to be unfolded (deployed) in the reverse order of that when it is folded.

The airbag 40, in which the first inflation chamber 61, the second inflation chamber 62, and the third inflation chamber 63 are each deployed and inflated as described above, is located between the upper body of the occupant P and the inwardly bulging body side portion 11. The airbag 40 pushes the upper body inward of the vehicle and restrains the upper body. The side impact transmitted to the upper body through the body side portion 11 is reduced by the inflation portion 46 and the upper body is protected.

Thus, the second embodiment has the following advantage in addition to the above described advantages (1) and (2).

Figure 19:
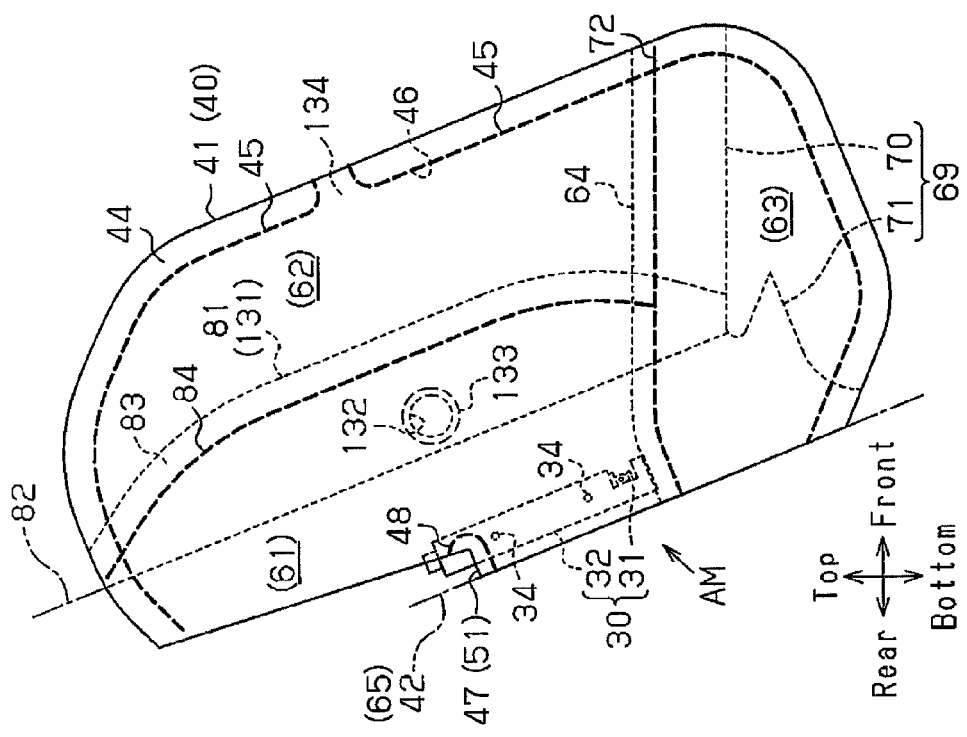
FIG. 19 is a side view of an airbag manufacturing method according to a second embodiment, showing an airbag module in a state where an airbag main body is in an uninflated and deployed state.
Figure 20:
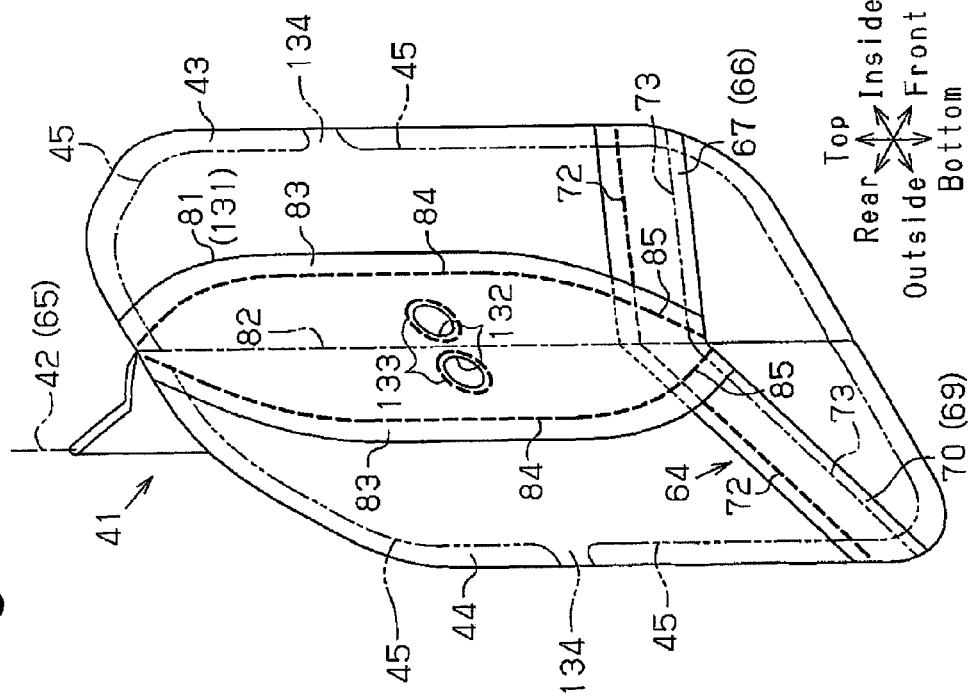
FIG. 20 is an explanatory perspective view corresponding to FIG. 8, showing a second joining step for an airbag according to the second embodiment.

(4) The vertical partition 81 (the second partition) used in the second joining step has the inner discharge holes 132 for connecting the first inflation chamber 61 and the second inflation chambers 62, which are adjacent to each other with the vertical partition 81 in between, with each other (FIGS. 19 and 20).

Therefore, through the second joining step, the vertical partition 81 (the second partition), which has the inner discharge holes 132, is installed to extend between the main body fabric portions 43, 44, and the extended ends (lower ends) on one side of the vertical partition 81 (the second partition) are coupled to the lateral partition 64 (the first partition).

Third Embodiment

A method for manufacturing an airbag according to a third embodiment will now be described with reference to FIGS. 21 to 23.

A lateral partition 64 (a first partition) used in the third embodiment has a sufficient width for being installed to extend between the main body fabric portions 43, 44 in an inflated state. This feature is the same as the first and second embodiments. In contrast, a vertical partition 81 (a second partition) is used that includes two fabric pieces 141, 142, which are independent from each other and each have an inner discharge hole 143. The vertical partition 81 (the second partition) has annular joint portions 144, each of which surrounds one of the inner discharge holes 143. The annular joint portions 144 reinforce parts about the inner discharge holes 143 of the vertical partition 81 (the second partition).

The vertical partition 81 has a sufficient width for being installed to extend between the main body fabric portions 43, 44 in an inflated state. When the airbag main body 41 is in the uninflated and deployed state, the fabric pieces 141, 142 are overlaid onto each other between the main body fabric portions 43, 44 (see FIG. 21). The fabric pieces 141, 142 extend substantially in the up-down direction, which intersects with the lateral partition 64. Each of the fabric pieces 141, 142 is joined to the airbag main body 41 at its upper end, which is an upper extended end. That is, the upper ends of the fabric pieces 141, 142 are joined to (sewn together with) the upper ends of the main body fabric portions 43, 44 by the peripheral joint portion 45.

Also, the fabric pieces 141, 142 are overlaid onto each other and located between the structural fabric portions 66, 69 at lower parts, which are lower extended ends. The lower ends of the fabric pieces 141, 142 are joined to (sewn together with) the main body forming fabric portions 67, 70 of the lateral partition 64 by the inner joint portion 73.

Parts of the fabric pieces 141, 142 that are not overlaid onto the main body forming fabric portions 67, 70 are joined to the main body fabric portions 43, 44 by the outer joint portions 84 provided along the peripheral portions 83 on an outer side. The "outer side" refers to the downstream side of the fabric pieces 141, 142 when the airbag main body 41 is in the uninflated and deployed state (see FIG. 21) and is located on the outer side when the vertical partition 81 (the second partition) is deployed. Parts of the fabric pieces 141, 142 that are overlaid onto the main body forming fabric portions 67, 70 are joined only to the main body forming fabric portions 67, 70 by the outer joint portions 85 provided along lower parts of the peripheral portions 83.

Further, the fabric pieces 141, 142 are joined to each other by inner joint portions 145 provided along peripheral portions 146 on an inner side. The "inner side" refers to the upstream side of the fabric pieces 141, 142 when the airbag main body 41 is in the uninflated and deployed state and is located on the inner side when the vertical partition 81 (the second partition) is deployed.

The second embodiment does not have the inner joint portions 145. Therefore, in addition to the above described first to fourth joining steps, a step is required for coupling the fabric pieces 141, 142 to each other at the inner peripheral portions 146 thereof (a coupling step).

After the second joining step is performed on the fabric pieces 141, 142, that is, after the fabric pieces 141, 142 are joined to the main body fabric portions 43, 44 and the structural fabric portions 66, 69 at the peripheral portions 83, it is difficult to perform the coupling step for joining the peripheral portions 146 to each other in a section upstream of the parts that have been joined in the second joining step. This is because the latter joining would involve an operation in a closed space.

In this respect, the coupling step is performed after the second joining step and before the third joining step to couple the fabric pieces 141, 142 to each other at the peripheral portions 146. As shown FIG. 23, in the coupling step, peripheral portions of the fabric pieces 141, 142 that are on the upstream side with respect to the flowing direction of inflation gas are defined as the inner peripheral portions 146, and the inner peripheral portions 146 are drawn out to positions downstream of the outer peripheral portions 83, for example. In this state, the inner peripheral portions 146 of the fabric pieces 141, 142 are coupled to each other. The coupling operation is easy since it is performed in an open space.

After the coupling step, the third and fourth joining steps are performed, which are the same as those described in the first and second embodiments.

The side airbag apparatus thus manufactured operates in the same manner as that described in the second embodiment.

Thus, the third embodiment has the following advantage in addition to the above described advantages (1), (2), and (4).

Figure 23:
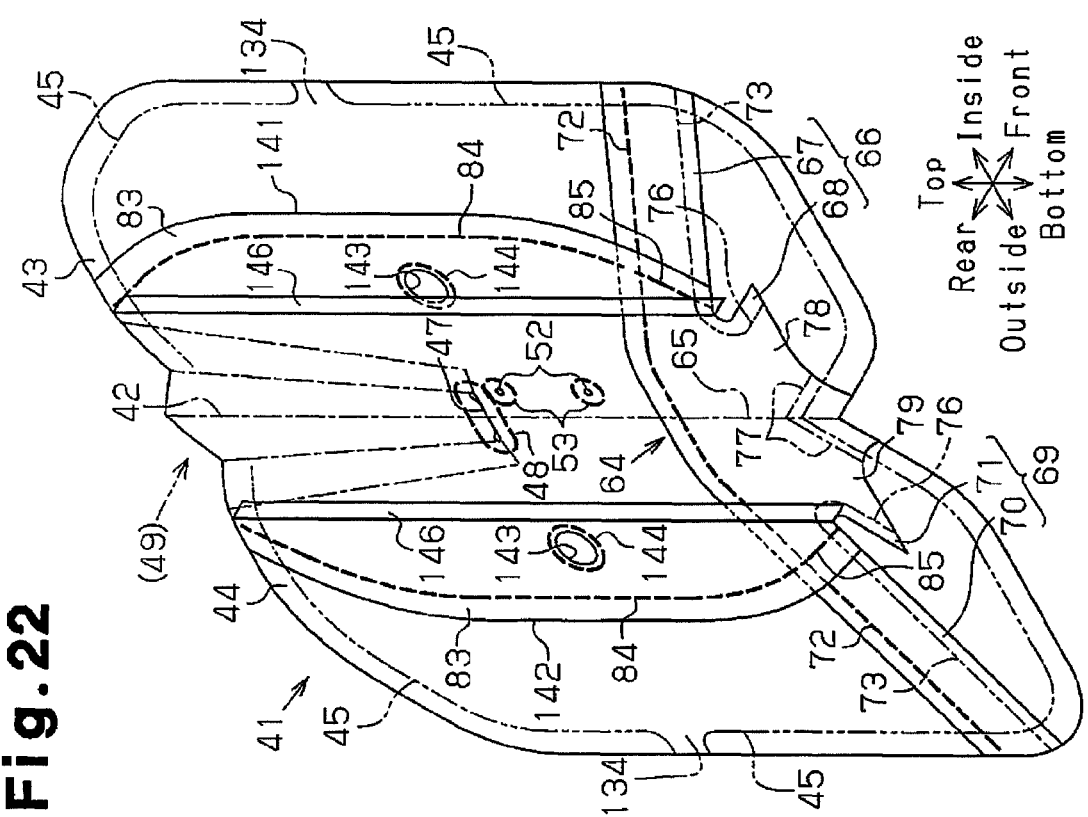
FIG. 23 is an explanatory perspective view showing a coupling step for the airbag according to the third embodiment.
Figure 25:
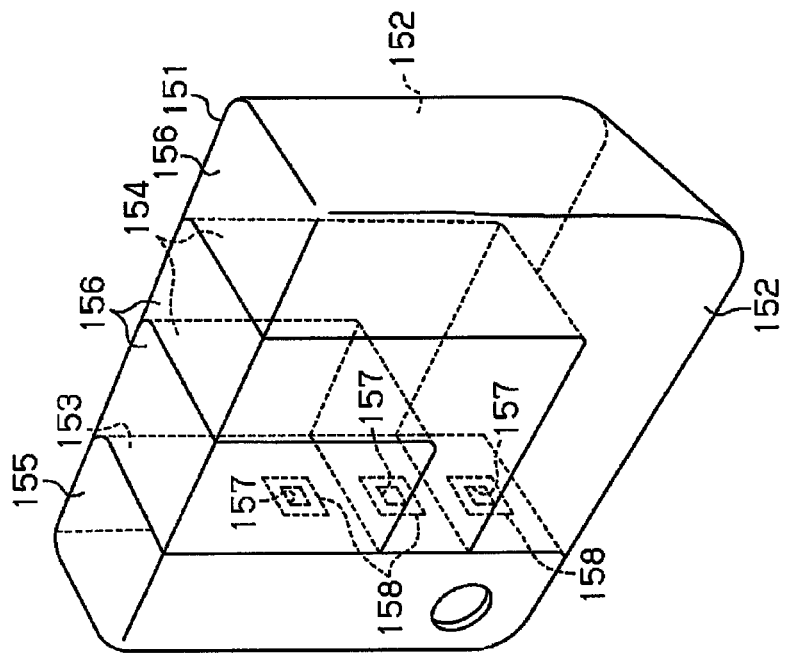
FIG. 25 is a perspective view showing an airbag in a conventional airbag apparatus.

(5) The coupling step is performed between the second joining step and the third joining step to couple the fabric pieces 141, 142 of the vertical partition 81 (the second partition) to each other at the inner peripheral portions 146 (FIG. 23).

Therefore, an advantage similar to the above described advantage (4) is achieved when the fabric pieces 141, 142, which are independent from each other, are used to form the vertical partition 81 (the second partition), and the fabric pieces 141, 142 each have the inner discharge hole 143. That is, through the second joining step, the vertical partition 81 (the second partition), which has the inner discharge holes 143, is installed to extend between the main body fabric portions 43, 44, and the extended ends (lower ends) on one side of the vertical partition 81 (the second partition) are coupled to the lateral partition 64 (the first partition).

Figure 21:
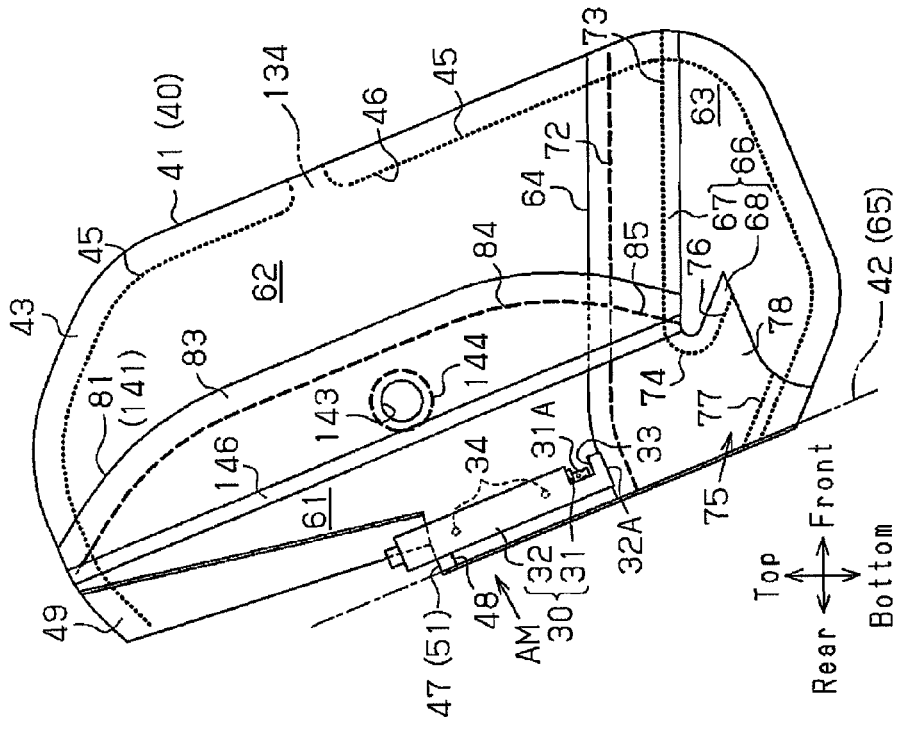
FIG. 21 is a partial cross-sectional side view of an airbag manufacturing method according to a third embodiment, corresponding to FIG. 5 and showing the internal structure of an airbag module.
Figure 22:
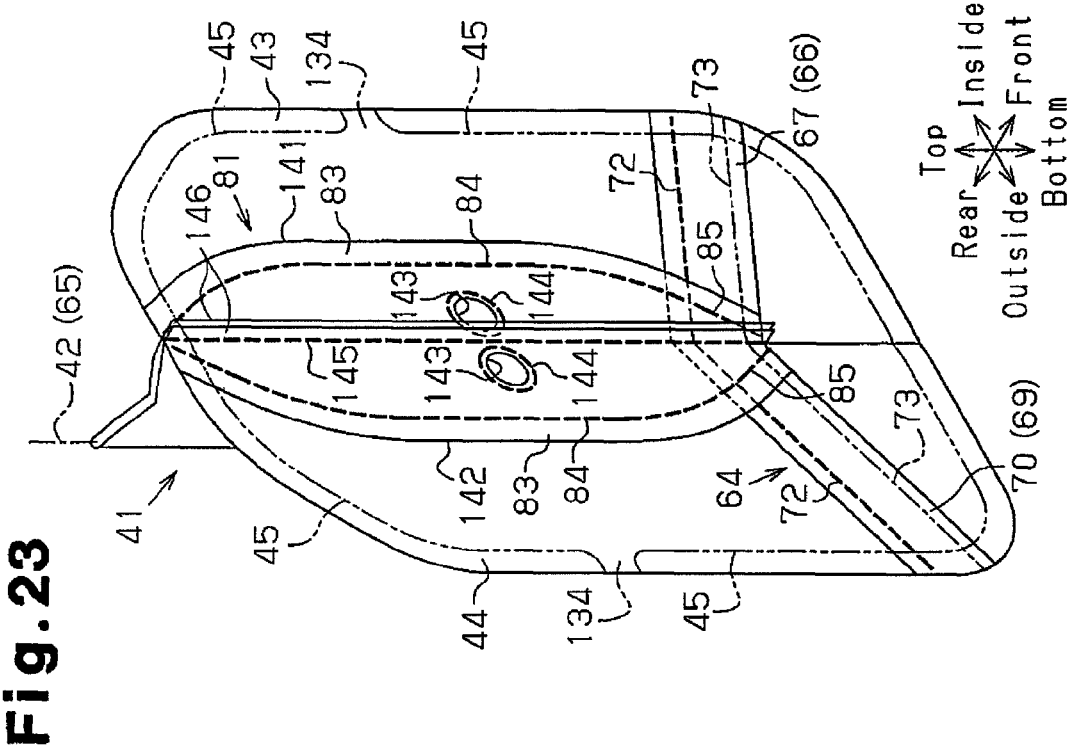
FIG. 22 is an explanatory perspective view showing the second joining step for an airbag according to the third embodiment.

(6) When the airbag 40 is in an uninflated and deployed state, the fabric pieces 141, 142 of the vertical partition 81 (the second partition) are overlaid onto each other between the main body fabric portions 43, 44 (FIG. 21). In the second joining step, peripheral portions of the fabric pieces 141, 142 that are located on the downstream side with respect to the flowing direction of inflation gas are defined as the outer peripheral portions 83 (FIG. 21). In addition, in the coupling step, peripheral portions of the fabric pieces 141, 142 that are on the upstream side with respect to the flowing direction of inflation gas are drawn out as the inner peripheral portions 146 to the downstream side. In this state, the inner peripheral portions 146 of the fabric pieces 141, 142 are coupled to each other (FIG. 23).

This allows the coupling step to be performed in an open space and thus facilitates the coupling step.

The first to third embodiments may be modified as follows.

<Regarding Inflator Assembly 30>

The retainer 32 may have a closed lower end and an open upper end, or may have open upper and lower ends.

The inflator 31 may be directly attached to the seat back 14 (the side frame portion 17) without using the retainer 32.

The inflator assembly 30 may be entirely located inside the inflation portion 46 (the first inflation chamber 61). Alternatively, the inflator assembly 30 may be entirely located outside the airbag 40.

<Regarding Inflation Portion 46>

The substantially entire airbag 40 may be formed of the inflation portion 46 as in the first to third embodiments, but may also partially include a non-inflation portion, which neither supplied with inflation gas nor inflated.

The part of the side of the body of the occupant P to be restrained and protected by the first inflation chamber 61 and the second inflation chamber 62 may be different from that of the first to third embodiments.

For example, the first inflation chamber 61 may be deployed and inflated beside the front half of the thorax PT, and the second inflation chamber 62 may be deployed and inflated beside the space in front of the thorax PT. In this case, the second inflation chamber 62 may be configured to receive inflation gas that has flowed from the first inflation chamber 61, thereby adjusting the internal pressure of the first inflation chamber 61.

<Regarding Lateral Partition 64>

In place of the tether extending between the main body fabric portions 43 and 44 of the airbag main body 41, the lateral partition 64 may be formed by a seam that is generated by bringing the main body fabric portions 43, 44 in contact with each other and sewing (joining) these together.

<Regarding Vertical Partition 81>

In the first embodiment, at least one of the upper fabric piece 86 and the lower fabric piece 87 of the vertical partition 81 may be divided into two along the folding line 82.

The peripheral portions 83 of the vertical partition 81 may be joined to the main body fabric portions 43, 44 either inside the first inflation chamber 61 or inside the second inflation chamber 62.

Also, one of the peripheral portions 83 may be joined inside the first inflation chamber 61, and the other peripheral portion 83 may be joined inside the second inflation chamber 62.

In the first embodiment, the opening 94 does not necessarily need to extend in the direction perpendicular to the folding line 82 of the vertical partition 81, but may extend in a direction diagonal to the folding line 82 or in a direction along the folding line 82.

In the first embodiment, the vertical partition 81 may be formed by a single member (fabric piece). In this case, the vertical partition 81 needs to have a sufficient width for being installed to extend between the main body fabric portions 43, 44 in an inflated state.

In the first embodiment, parts of the overlapping portions 91 that correspond to the opening 94 (parts in the vicinity of the opening 94, or more accurately, parts between the opening 94 and the edges 88E, 89E) function as the valve bodies 95, 96. Therefore, as long as at least the distal ends 95T, 96T of the valve bodies 95, 96 are in contact with each other and are closed when the first inflation chamber 61 is deployed and inflated, parts of the overlapping portions 91 that do not correspond to the opening 94 (parts not in the vicinity) may be modified. For example, parts of the overlapping portions 91 that do not correspond to the opening 94 (parts not in the vicinity) may be joined partially or entirely. The joining means may be sewing or adhering. According to this modification, only parts of the overlapping portions 91 that correspond to the opening 94 operate as the valve bodies 95, 96, and parts of the overlapping portions 91 that do not correspond to the opening 94 are prevented from unnecessarily moving, for example, flapping.

Furthermore, a cutout may be formed at least at part of the portion of the overlapping portions 91 that does not correspond to the opening 94.

In the first embodiment, the vertical partition 81 may be formed by a member different from the members forming the valve bodies 95, 96.

In the first and second embodiments, the folding line 82 of the vertical partition 81 when folded in half may be slightly inclined with respect to the up-down direction of the airbag module AM.

In the first embodiment, the portion to be disjoined in the inner joint portion 93 does not necessarily have to be provided at a portion that extends across the folding line 82, but may be provided at a portion displaced away from the folding line 82 in the direction perpendicular to the folding line 82.

The inner joint portions 93 may be disjoined at two or more positions.

In the first embodiment, the overlapping portions 91, which include the valve bodies 95, 96, may be provided in the second inflation chamber 62 instead of the first inflation chamber 61, prior to deployment and inflation of the inflation portion 46.

In the first embodiment, the vertical partition 81, which is folded in half, may be provided in the inflation portion 46 in the uninflated and deployed state with the folding line 82 located downstream of the peripheral portions 83. In this case, the overlapping portions 91, which have the valve bodies 95, 96, may be located in the second inflation chamber 62 before the inflation portion 46 is deployed and inflated.

In the first embodiment, the edges 88E, 89E of the ends 88, 89 of the upper and lower fabric pieces 86, 87 of the vertical partition 81 may be overlaid onto each other in a band-like shape to form a pair of overlapping portions 91.

The vertical partition 81 may have a shape different from those in the first to third embodiments. In this case, the outer shape of the vertical partition 81 is preferably changed in accordance with a part of the upper body of the occupant P to be restrained and protected by the first inflation chamber 61. Accordingly, the structure of the outer joint portion 84, which joins the vertical partition 81 to the main body fabric portions 43, 44, is different from that in the first to third embodiments. For example, when protecting the shoulder region PS of the occupant P in a wider area, the outer joint portion 84 may be provided at a position further forward than its positions in the first to third embodiments. In this case, a part of the outer joint portion 84 that joins the upper fabric piece 86 to the main body fabric portions 43, 44 may be inclined forward toward the upper end in the first embodiment.

When the airbag main body 41 is deployed and inflated, the vertical partition 81 may be located at the front end of the side support portion 16 of the vehicle seat 12 or a position that is slightly forward of the front end.

Figure 24:
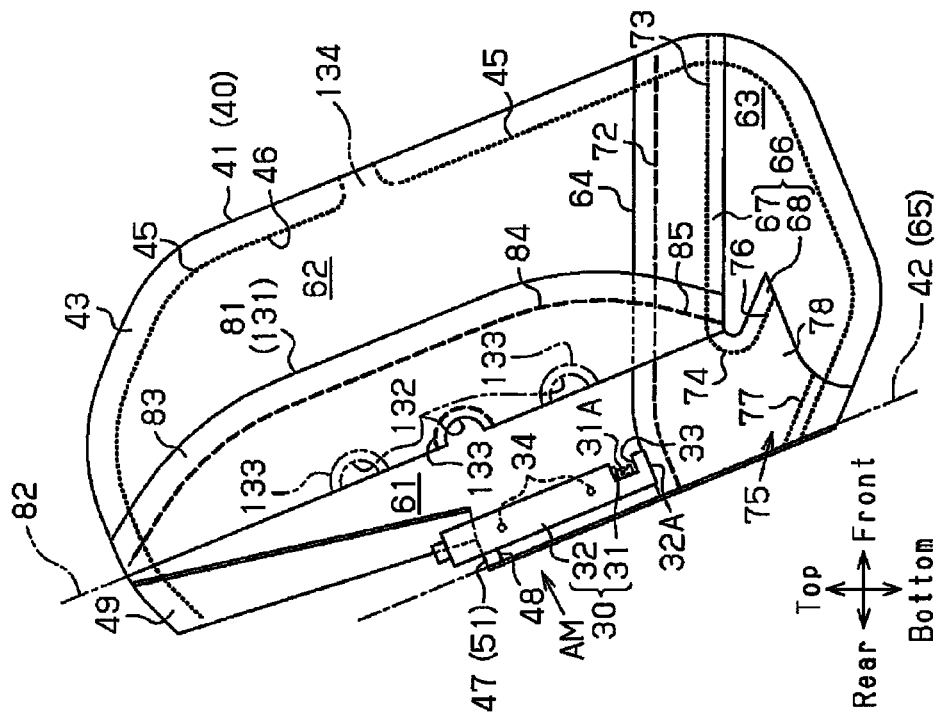
FIG. 24 is a partial cross-sectional side view showing the internal structure of an airbag module according to a modification.

The inner discharge holes 132 may be located at positions different from those in the second embodiment. FIG. 24 shows one example. The inner discharge holes 132 are located on the folding line 82 of the vertical partition 81 (the second partition). In this case, only one inner discharge hole 132 may be provided as indicated by the solid line in FIG. 24. Alternatively, two or more inner discharge holes 132 may be provided at different positions as indicated by broken lines in which a long dash alternates with a pair of short dashes.

The positions of the inner discharge holes 132 shown in FIG. 24 are merely an example, and may be changed as necessary.

In the second embodiment, the vertical partition 81 may be formed by two or more fabric pieces. In this case, the fabric pieces need to be joined to form a single piece before the second joining step is performed.

In the third embodiment, only one of the fabric pieces 141, 142 of the vertical partition 81 (the second partition) may have an inner discharge hole 143 in the third embodiment.

If the inner discharge holes 132, 143 have a sufficiently high strength in the second and third embodiments, the annular joint portions 133, 144 may be omitted.

<Regarding Storage Portion 21 of Airbag Module AM>

Instead of the seat back 14 of the vehicle seat 12, a part that corresponds to the storage portion 21 may be located in the body side portion 11 to accommodate the airbag module AM.

<Regarding Check Valve 75>

The check valve 75 may be formed by a member separate from the lateral partition 64.

<Regarding Manufacture of Airbag 40>

In the second joining step, the outer joint portions 84 may be formed either before or after the outer joint portions 85 are formed.

<Other Modifications>

The part of the upper body of the occupant P to be protected by the side airbag apparatus may be different from that in the first to third embodiments.

The above described airbag manufacturing methods may be applied to a side airbag apparatus of a vehicle having a seat 12 that faces in a direction other than the forward direction, for example, sideways. In this case, when an impact is applied to a side of the vehicle seat 12 (in the front-rear direction of the vehicle), the side airbag apparatus protects an occupant P from the impact.

Other than side airbag apparatuses, the above described airbag manufacturing methods may be applied to any type of airbag apparatus that inflates an airbag at a position close to an occupant to restrain the occupant. In any case, an airbag to which the present invention is applicable is required to have an inflation portion divided into two or more inflation chambers by a first partition and a second partition.

The present invention may be applied, for example, to a knee protecting airbag apparatus.

A knee protecting airbag is designed for restraining and protecting the knees of an occupant from an impact. Specifically, when an impact is applied to a vehicle seat due to, for example, a frontal collision, with an average sized occupant (adult) seated in the vehicle seat in a normal posture, the knee protecting airbag is deployed and inflated from front toward the lower limbs of the occupant. The airbag then restrains a region including the shins and knees of the occupant to protect the region from the impact.

Vehicles to which the side airbag apparatus according to the present invention is applied include various industrial vehicles in addition to private automobiles.

The above described airbag manufacturing methods may also be applied to an airbag apparatus installed in the seats of vehicles other than motor vehicles, for example, aircrafts and ships.

The invention claimed is:

1. A method for manufacturing an airbag, wherein the airbag is formed into a bag shape by joining peripheral portions of two main body fabric portions and has an inflation portion that is inflated by inflation gas, the airbag includes two structural fabric portions, a first partition is installed to extend between the main body fabric portions, a second partition having an extended end is installed to extend between the main body fabric portions in a state in which the second partition extends in a direction intersecting with the first partition and the extended end is overlaid onto the structural fabric portions, at least a part of the inflation portion is divided into a plurality of inflation chambers by the first partition and the second partition, the airbag manufacturing method comprising:

a first joining step, in which a peripheral portion in each structural fabric portion that is brought closer to the main body fabric portions at the installation is joined to the main body fabric portions in a spread state;

a second joining step, in which, in a pair of outer peripheral portions of the second partition in a spread state, a part that is not overlaid onto the structural fabric portions is joined to the main body fabric portions, and a part that is overlaid onto the structural fabric portions is joined only to the structural fabric portions; and a third joining step, in which peripheral portions of the structural fabric portions that are separated away from the main body fabric portions at the installation are joined to each other.

2. The method for manufacturing an airbag according to claim 1, wherein the third joining step includes forming, during the process for joining the peripheral portions of the structural fabric portions that are separated away from the main body fabric portions at the installation to each other, an opening for connecting the inflation chambers adjacent to each other with the first partition in between and a valve for opening and closing the opening.

3. The method for manufacturing an airbag according to claim 1, wherein the second joining step includes using the second partition, which includes an opening for connecting the inflation chambers adjacent to each other and a valve for opening and closing the opening.

4. The method for manufacturing an airbag according to claim 1, wherein the second joining step includes using the second partition, which has an inner discharge hole for connecting the inflation chambers adjacent to each other.

5. A method of manufacturing an airbag, wherein the airbag is formed into a bag shape by joining peripheral portions of two main body fabric portions and has an inflation portion that is inflated by inflation gas, the airbag includes two structural fabric portions, a first partition is installed to extend between the main body fabric portions, a second partition having an extended end is installed to extend between the main body fabric portions in a state in which the second partition extends in a direction intersecting with the first partition and the extended end is overlaid onto the structural fabric portions, at least a part of the inflation portion is divided into a plurality of inflation chambers by the first partition and the second partition, the second partition includes two fabric pieces, which are independent from each other and at least one of the fabric pieces has an inner discharge hole, a first joining step, in which a peripheral portion in each structural fabric portion that is brought closer to the main body fabric portions at the installation is joined to the main body fabric portions in a spread state;

a second joining step, in which, in an outer peripheral portion of each fabric piece of the second partition, a part that is not overlaid onto the structural fabric portions is joined to the main body fabric portions, and a part that is overlaid onto the structural fabric portions is joined only to the structural fabric portions;

a coupling step for coupling the fabric pieces to each other at inner peripheral portions thereof; and a third joining step, in which peripheral portions of the structural fabric portions that are separated away from the main body fabric portions at the installation are joined to each other.

6. The method for manufacturing an airbag according to claim 5, wherein when the airbag is in an uninflated and deployed state, the fabric pieces of the second partition are overlaid onto each other between the main body fabric portions, in the second joining step, peripheral portions of the fabric pieces that are located on the downstream side with respect to the flowing direction of inflation gas are defined as the outer peripheral portions, and in the coupling step, peripheral portions of the fabric pieces that are located on the upstream side with respect to the flowing direction of the inflation gas are defined as the inner peripheral portions and are drawn out to the downstream side, wherein, in this state, the inner peripheral portions of the fabric pieces are coupled to each other.

\* \* \* \* \*